United States Patent
Choi et al.

(10) Patent No.: US 10,057,848 B2
(45) Date of Patent: Aug. 21, 2018

(54) METHODS OF OPERATING NEAR FIELD COMMUNICATION DEVICES

(71) Applicant: Samsung Electronics Co., Ltd., Suwon-si, Gyeonggi-do (KR)

(72) Inventors: Sung-Hye Choi, Suwon-si (KR); Seong-Sik Myoung, Suwon-si (KR); Bong-Su Jeon, Mungyeong-si (KR); Il-Jong Song, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/372,970

(22) Filed: Dec. 8, 2016

(65) Prior Publication Data

US 2018/0115948 A1 Apr. 26, 2018

(30) Foreign Application Priority Data

Oct. 26, 2016 (KR) ........................ 10-2016-0140303

(51) Int. Cl.
*H04B 7/00* (2006.01)
*H04W 52/02* (2009.01)
*H04W 4/00* (2018.01)
*H04L 12/801* (2013.01)
*H04W 4/02* (2018.01)
*H04W 4/80* (2018.01)

(52) U.S. Cl.
CPC ......... *H04W 52/0209* (2013.01); *H04L 47/29* (2013.01); *H04W 4/008* (2013.01); *H04W 4/023* (2013.01); *H04W 4/80* (2018.02)

(58) Field of Classification Search
None
See application file for complete search history.

(56) References Cited

U.S. PATENT DOCUMENTS

| 8,587,376 B2 | 11/2013 | Reining |
| 8,929,812 B2 | 1/2015 | Gree |
| 8,942,628 B2 | 1/2015 | Haverinen |
| 9,379,786 B2 | 6/2016 | Cho et al. |
| 2007/0111692 A1 | 5/2007 | Kuramoto et al. |

(Continued)

FOREIGN PATENT DOCUMENTS

| JP | 2010-049292 A | 3/2010 |
| JP | 2016-134064 A | 7/2016 |
| KR | 10-0777369 B1 | 11/2007 |

*Primary Examiner* — Mohammed Rachedine
(74) *Attorney, Agent, or Firm* — Harness, Dickey & Pierce, PLC

(57) ABSTRACT

Operating an NFC device to communicate with an NFC tag may include converting the NFC device between operating in a standby mode or an active mode, based on whether communication between the NFC device and an NFC tag is failed while the NFC device is operating in an active mode, detecting an NFC tag based on a tag detection sensitivity associated with the NFC device operating in the standby mode, converting the NFC device to operating in the active mode when an NFC tag is detected in the standby mode and adaptively controlling the tag detection sensitivity based on one or more user environment parameters associated with the NFC device. Power consumption and the tag detection sensitivity may be optimized based on adaptively controlling the tag detection sensitivity based on the one or more user environment parameters.

19 Claims, 20 Drawing Sheets

(56) References Cited

U.S. PATENT DOCUMENTS

2013/0281139 A1* 10/2013 Wilhelmsson .... H04W 52/0245
455/500
2014/0304094 A1* 10/2014 Reddy ................. G02B 6/0073
705/17
2015/0079903 A1 3/2015 Song et al.
2017/0237469 A1* 8/2017 Taghivand ............. H02J 50/20
455/41.1

* cited by examiner

METHODS OF OPERATING NEAR FIELD COMMUNICATION DEVICES

CROSS-REFERENCE TO RELATED APPLICATIONS

This U.S. Non-provisional application claims priority under 35 U.S.C. § 119 to Korean Patent Application No. 10-2016-0140303, filed on Oct. 26, 2016, in the Korean Intellectual Property Office (KIPO), the disclosure of which is incorporated by reference in its entirety herein.

BACKGROUND

1. Technical Field

Example embodiments relate generally to semiconductor devices, and more particularly to methods of operating near field communication (NFC) devices.

2. Discussion of the Related Art

Near field communication (NFC) technology is a short-range wireless communication technology. As NFC technology has been developed, NFC devices have been more commonly employed in mobile devices. In some cases, when included in a mobile device, an NFC device may consume power from a power supply (e.g., a battery) of the mobile device. As a result, the inclusion of an NFC device in a mobile device may result in increased power consumption from a power supply of the mobile device, thereby resulting in an increased rate of electrical power depletion in the mobile device.

SUMMARY

Some example embodiments may provide an NFC device and/or a method of operating an NFC device that includes adaptively controlling a tag detection sensitivity associated with the NFC device.

According to some example embodiments, a method of operating a near field communication (NFC) device may include: converting the NFC device to operate in a standby mode based on a determination that communication between the NFC device and an NFC tag is unsuccessful while the NFC device is operating in an active mode, detecting at least one NFC tag while the NFC device is operating in the standby mode, converting the NFC device to operate in the active mode based on detecting the at least one NFC tag while the NFC device is operating in the standby mode, and adaptively controlling the tag detection sensitivity associated with the NFC device based on a determination that a user environment parameter associated with the NFC device at least meets a threshold value. The standby mode may be associated with a first NFC power consumption level, the active mode associated with a second NFC power consumption level, the first NFC power consumption level lower than the second NFC power consumption level.

According to some example embodiments, a method of operating a near field communication (NFC) device may include: converting the NFC to operating in a standby mode based on a determination that communication between the NFC device and an NFC tag is unsuccessful while the NFC device is operating in an active mode, and converting the NFC device to operate in the active mode based on detecting the at least one NFC tag while the NFC device is operating in the standby mode.

According to some example embodiments, a method may include: configuring a near field communication (NFC) device to operate in a standby mode based on a determination that the NFC device is unengaged in NFC communications while the NFC device is operating in an active mode, and configuring the NFC device to operate in the active mode, based on detecting, at the NFC device, at least one NFC tag while the NFC device is operating in the standby mode. The standby mode may be associated with a first NFC power consumption level. The active mode may be associated with a second NFC power consumption level. The first NFC power consumption level may be lower than the second NFC power consumption level.

The NFC device and the method of operating the NFC device according to some example embodiments may be configured to optimize power consumption and the tag detection range based on adaptively controlling the tag detection sensitivity based on one or more user environment parameters associated with the NFC device. The tag detection range may be secured by increasing the tag detection sensitivity to increase communication success rate and enhance user experience when probability of the communication to be performed by the NFC device is relatively high. In contrast, the power consumption may be reduced by decreasing the tag detection sensitivity when the probability of the communication to be performed by the NFC device is relatively low.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
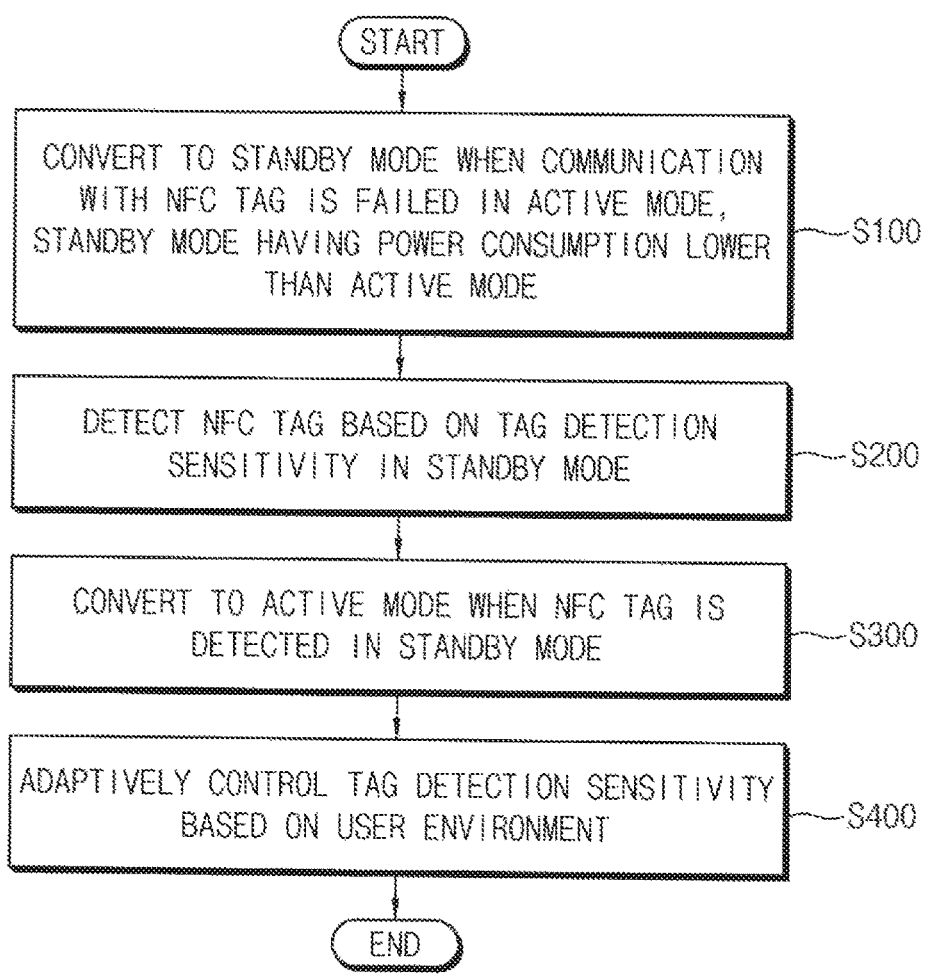
FIG. 1 is a flow chart illustrating a method of operating a near field communication (NFC) device according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of operating a near field communication (NFC) device according to some example embodiments.

Referring to FIG. 1, in some example embodiments, a near field communication (NFC) device converts (e.g., is configured) to operating in a standby mode when a determination is made that communication between the NFC device and an NFC tag fails (e.g., the NFC device is disengaged from communication with an NFC tag). Such a determination may be made while the NFC device is operating in an active mode. The standby mode is associated with a reduced power consumption at the NFC device (e.g., a first NFC power consumption level), relative to power consumption at the NFC device operating in the active mode (e.g., a second NFC power consumption level) (S100). The NFC device detects an NFC tag, based on a tag detection sensitivity associated with the NFC device, while the NFC device is operating in the standby mode (S200) and the NFC device converts to the active mode based on a determination at the NFC device that an NFC tag is detected. Such a determination may be made while the NFC device is operating in the standby mode (S300). According to some example embodiments, the NFC device adaptively controls the tag detection sensitivity based on one or more user environment parameters associated with the NFC device (S400). Tag detection sensitivity associated with an NFC device may refer to a sensitivity of the NFC device to detection and/or communication with one or more NFC tags within a particular threshold proximity range of the NFC device. Tag detection sensitivity associated with an NFC device may refer to a configuration of the NFC device to detect and/or communicate with one or more NFC tags within a particular threshold proximity range of the NFC device. In some example embodiments, tag detection sensitivity associated with an NFC device is proportional to a maximum range from the NFC device at which an NFC tag may be detected by the NFC device. A tag detection sensitivity associated with an NFC device may be adjusted based on adjusting one or more characteristics of the NFC device, including adjusting a power consumption level associated with of the NFC device, adjusting a configuration of one or more elements of the NFC device, some combination thereof, or the like. User environment parameters associated with an NFC device may include one or more detected and/or determined parameters associated with one or more aspects of an external environment that is within a particular proximity range ("proximity distance") of the NFC device. The one or more user environment parameters may include at least one of a duration time elapsed while the NFC device is operating in the standby mode and a communication fail count indicating a number ("quantity") of failures of communication between the NFC device and one or more previously detected NFC tags (e.g., a quantity of failed attempts of communication between the NFC device and at least one previously detected NFC tag).

In an NFC system, a NFC device functioning as an NFC reader may operate in a standby mode to detect an NFC tag, such that power consumption is reduced to the first NFC power consumption level (e.g., power is "saved") when there is no NFC tag in proximity (e.g., within a particular threshold proximity range) to the NFC device. If and/or when an NFC tag is detected at the NFC device functioning as an NFC reader, the NFC reader may convert to the active mode, such that power consumption at the NFC device is increased to the second power consumption level, and engage in communications (e.g., NFC communication) with the detected NFC tag. As the tag detection sensitivity associated with the NFC device is increased, the user experience may be enhanced and the power consumption associated with the NFC device may be increased. According to some example embodiments, adaptively controlling the tag detection sensitivity based on one or more user environment parameters associated with the NFC device may include adaptively (e.g., "dynamically") controlling the tag detection sensitivity associated with the NFC device based on the one or more user environment parameters associated with the NFC device to optimize the power consumption associated with the NFC device and the tag detection range associated with the NFC device. Adaptively controlling the tag detection sensitivity based on one or more user environment parameters associated with the NFC device may include adaptively controlling the tag detection sensitivity based on a determination that a user environment parameter associated with the NFC device at least meets a particular condition. The particular condition may include a threshold value (e.g., a threshold duration value, threshold quantity value, etc.), a range of one or more values (e.g., a range of threshold duration values, a range of threshold quantity values, etc.), some combination thereof, or the like.

Adaptively controlling the tag detection sensitivity based on a user environment parameter associated with the NFC device may include, based on a determination that a probability that the NFC device will imminently engage in NFC communication is relatively low (e.g., below a threshold probability value), decreasing the tag detection sensitivity associated with the NFC device to reduce the power consumption associated with the NFC device. In some example embodiments, adaptively controlling the tag detection sensitivity based on a user environment parameters associated with the NFC device may include decreasing the tag detection sensitivity associated with the NFC device based on a determination that a duration time elapsed while the NFC device is operating in a standby mode exceeds a reference time (e.g., a threshold duration value). In some example embodiments, adaptively controlling the tag detection sensitivity based on user environment may include decreasing the tag detection sensitivity if a communication fail count indicating a number ("quantity") of failures of communication with previously detected NFC tags exceeds a reference count (e.g., a threshold quantity value).

Adaptively controlling the tag detection sensitivity based on a user environment parameter associated with the NFC device may include, based on a determination that a probability that the NFC device will imminently engage in NFC communication is relatively high (e.g., above a threshold probability value), increasing the tag detection sensitivity associated with the NFC device to increase NFC communication success rate and enhance user experience. In some example embodiments, adaptively controlling the tag detection sensitivity based on user environment may include increasing the tag detection sensitivity associated with the NFC device based on a determination that communication between the NFC device and a detected NFC tag is successful (e.g., the NFC is engaged in communication with the detected NFC tag). In some example embodiments, adaptively controlling the tag detection sensitivity based on user environment may include increasing the tag detection sensitivity associated with the NFC device to a maximum sensitivity level based on user interaction with the NFC device, including a user-initiated activation of an NFC function associated with the NFC device (e.g., the user enables an NFC function of the NFC device).

Figure 2:
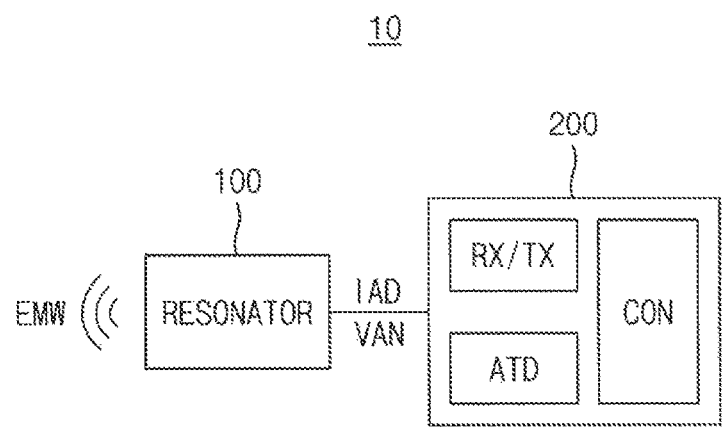
FIG. 2 is a block diagram illustrating an NFC device according to some example embodiments.

FIG. 2 is a block diagram illustrating an NFC device according to some example embodiments.

The NFC device 10 illustrated in FIG. 2 may communicate (e.g., engage in communication) with an external device through an NFC scheme. In some example embodiments, the NFC device 10 may perform an operation of detecting whether an NFC card is near the NFC device 10 (e.g., within a certain threshold proximity range of the NFC device 10), and an operation of detecting whether an NFC reader is near the NFC device 10 (e.g., within a certain threshold proximity range of the NFC device 10, where the threshold proximity range associated with NFC reader detection may be common or different with regard to a threshold proximity range associated with an NFC card). These operations as an NFC card (or tag) and an NFC device may be performed alternatively and repeatedly. If and/or when the NFC device 10 detects an NFC reader near the NFC device 10, the NFC device 10 may operate in a card mode, in which the NFC device 10 operates as a card. In the card mode, the NFC device 10 may communicate data (e.g., transmit and receive data) with the NFC reader using an electromagnetic wave EMW emitted from the NFC reader. If and/or when the NFC device 10 detects an NFC card near the NFC device 10 (e.g., within a threshold proximity range of the NFC device 10), the NFC device 10 may operate in a reader mode, in which the NFC device 10 operates as a reader. In the reader mode, the NFC device 10 may emit an electromagnetic wave EMW to communicate data with the NFC card.

Referring to FIG. 2, the NFC device 10 includes a resonator 100 (also referred to herein as a resonance unit 100) and an NFC chip 200. The NFC chip 200 includes a transceiver unit RX/TX, an adaptive tag detector ATD and a controller CON. One or more of the elements of the NFC device 10 may be implemented by one or more processors executing program instructions stored on a memory device.

The resonance unit 100 may include a resonance circuit that includes an antenna having an inductance component and a resonance capacitor. The transceiver unit RX/TX is coupled to the resonance unit 100. As referred to herein, a "coupled" element may be coupled directly or indirectly to another element. The transceiver unit RX/TX demodulates an RF signal received through the resonance unit 100 to provide the demodulated signal to the controller CON and modulates a signal from the controller CON to transmit the modulated RF signal through the resonance unit 100. The adaptive tag detector ATD detects whether an NFC card or an NFC tag is near the NFC device 10 during the standby mode. The controller CON may include a processor, a memory block, etc. for controlling overall operations of the NFC device 10. The controller CON may control conversion of the NFC device 10 between operating in one of the above mentioned active and standby modes and adaptively control the tag detection sensitivity associated with the NFC device 10 based on one or more user environment parameters associated with the NFC device 10. The configurations and operations of the NFC chip 200 will be further described below with reference to FIGS. 5 and 15.

If and/or when the NFC device 10 is operating in the reader mode, the resonance unit 100 emits the electromagnetic wave EMW to communicate data with the NFC card. If and/or when the NFC device 10 is operating in the reader mode, the NFC chip 200 may provide an output current or a driver current LAD to the resonance unit 100 and the resonance unit 100 may emit the electromagnetic wave EMW corresponding to the driver current IAD to communicate with the NFC card. Since the NFC card includes a resonance circuit that includes an antenna having an inductance component and a resonance capacitor, a mutual induction may occur between the resonance unit 100 and the NFC card, which is located near the resonance unit 100, while the resonance unit 100 emits the electromagnetic wave EMW. Therefore, an antenna voltage VAN may be generated at the resonance circuit of the resonance unit 100 through the mutual induction with the NFC card.

Figure 3:
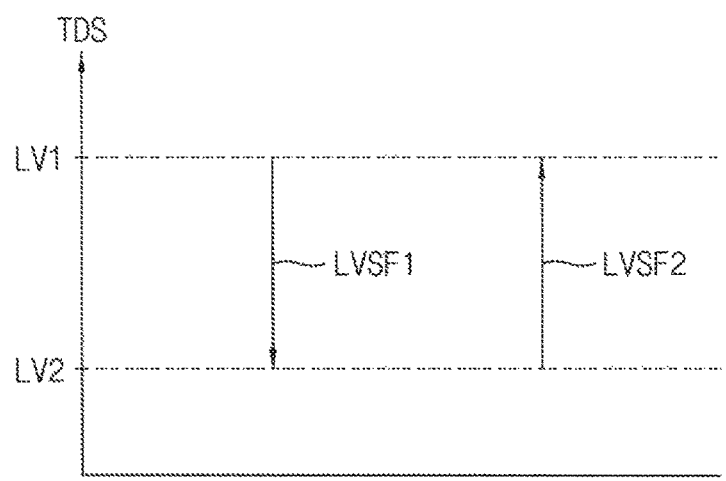
FIG. 3 is a conceptual diagram illustrating control of a tag detection sensitivity associated with an NFC device according to some example embodiments.

FIG. 3 is a conceptual diagram illustrating control of a tag detection sensitivity associated with an NFC device according to some example embodiments.

Referring to FIG. 3, a tag detection sensitivity associated with an NFC device (TDS) may be shifted between a first sensitivity level LV1 and a second sensitivity level LV2 that is lower than the first sensitivity level LV1 based on a user environment parameter associated with the NFC device during a standby mode (e.g., while the NFC device is operating in a standby mode) such that power consumption associated with the NFC device is reduced. If and/or when the user environment parameter changes such that the probability of imminent communication by the NFC device is decreased, a level down operation LVSF1 may be performed to decrease the tag detection sensitivity TDS from the first sensitivity level LV1 to the second sensitivity level LV2. If and/or when the user environment parameter changes such that the probability of imminent communication by the NFC device is increased, for example, when communication with a detected NFC tag succeeds, a level up operation LVSF2 may be performed to increase the tag detection sensitivity TDS from second sensitivity level LV2 to the first sensitivity level LV1.

If and/or when the tag detection sensitivity TDS is fixed at a relatively high level, across a range of user environment parameters, invalid signals may be detected or tag detection errors may be increased and thus the power consumption associated with the NFC device may be increased. In some example embodiments, if and/or when the tag detection sensitivity TDS fixed at a relatively low level, the tag detection range may be narrowed and thus a user experience associated with the NFC device may be negatively affected. According to some example embodiments, the tag detection sensitivity TDS may be controlled adaptively based on the user environment parameter to optimize the power consumption and the tag detection range associated with the NFC device.

Figure 4:
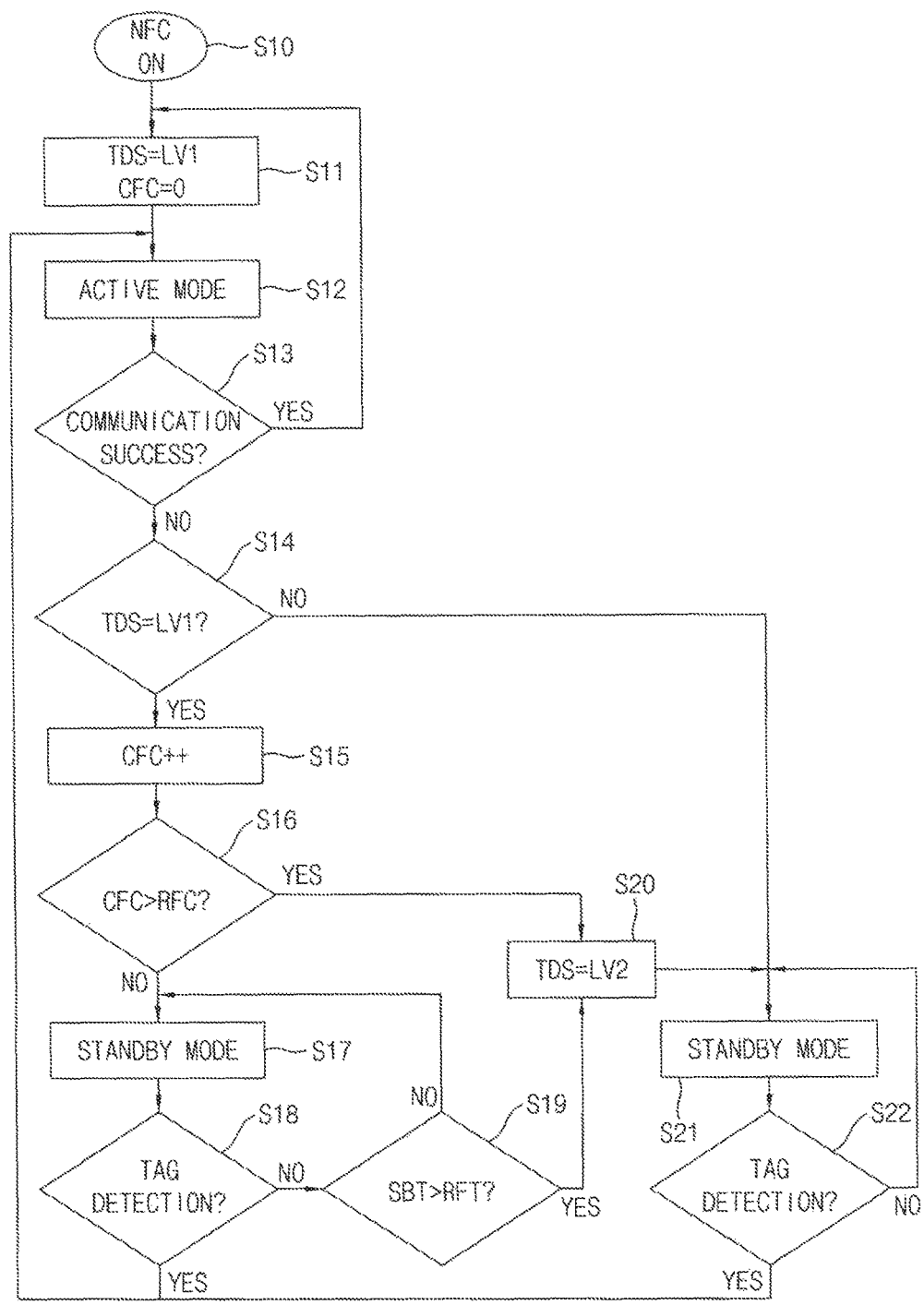
FIG. 4 is a flow chart illustrating a method of operating an NFC device according to some example embodiments.

FIG. 4 is a flow chart illustrating a method of operating an NFC device according to some example embodiments.

FIG. 4 illustrates a control of the tag detection sensitivity TDS between the first sensitivity level LV1 and the second sensitivity level LV2 as described with reference to FIG. 3.

Referring to FIGS. 2, 3 and 4, based on a determination that a user enables the NFC function of the NFC device (NFC ON) (S10), the controller CON in the NFC chip 200 may initialize the tag detection sensitivity TDS to a first sensitivity level LV1, and the communication fail count CFC to zero (S11). LV1 may be a maximum tag detection sensitivity level. After the initialization, the NFC chip 200 may perform an operation in the active mode (S12).

If and/or when the NFC device 10 is operating in the active mode, the NFC chip 200 may generate the RF field to detect and activate an NFC tag that is near the NFC device 10. The RF field or the electromagnetic wave EMW may be generated in the active mode by emitting pulses having a pulse width of, for example, a few score milliseconds through a few hundred milliseconds. If and/or when there is a NFC tag in the RF field, the NFC tag may send a message to the NFC device 10 and the NFC device 10 may activate a connection or a link to the tag. The activation of the tag may include sequentially transmitting activation commands for various types of NFC tags ("tags"). If and/or when the valid response is not received, the NFC device 10 may determine that the communication is failed and turn off the RF field.

If and/or when the communication is successful (S13: YES), the controller CON initialize the tag detection sensitivity TDS and the communication fail count CFC (S11) and performs the operation in the active mode (S12) as described above. If and/or when the communication is failed (S13: NO), the controller CON checks whether the present tag detection sensitivity TDS is a first sensitivity level LV1 (S14).

If and/or when the tag detection sensitivity TDS is the first sensitivity level LV1 (S14: YES), the controller CON increases the communication fail count CFC by one sensitivity level increment (S15) and checks whether the current communication fail count CFC exceeds a reference count RFC (e.g., a threshold quantity) (S16). If and/or when the tag detection sensitivity TDS is the second sensitivity level LV2 that is lower than the first sensitivity level LV1 (S14: NO), the controller CON converts the NFC device from operating in the active mode to operating in the standby mode and the adaptive tag detector ATD performs an operation in the standby mode (S21), that is, an operation of tag detection based on the tag detection sensitivity TDS of the second sensitivity level LV2.

If and/or when the communication fail count CFC does not exceed the reference count RFC (e.g., threshold quantity value) (S16: NO), the controller CON converts the NFC device 10 from operating in the active mode to operating in the standby mode and the adaptive tag detector ATD performs the operation in the standby mode (S17), that is, the operation of the tag detection based on the tag detection sensitivity TDS of the first sensitivity level LV1.

The NFC device 10 functioning as the NFC reader may operate in the standby mode to detect a tag near the NFC device 10, thereby "saving power" (e.g., "conserving power," reducing power consumption, etc.). The standby mode may be referred to as a low power sensing (LPS) mode. The RF field or the electromagnetic wave EMW may be generated in the standby mode based on emitting pulses having a pulse width of, for example, a few hundred microseconds. The power consumption associated with the NFC device 10 may be reduced based on decreasing the pulse width in the standby mode in comparison with the active mode.

If and/or when a tag is not detected based on the tag detection sensitivity TDS of the first sensitivity level LV1 (S18: NO), the adaptive tag detector ATD performs the operation in the standby mode as described above (S17) until a duration time SBT of the standby mode (e.g., a duration time elapsed while the NFC device is operating in the standby mode) exceeds a reference time RFT (e.g., a threshold duration value) (S19: NO). If and/or when a tag is detected based on the tag detection sensitivity TDS of the first sensitivity level LV1 (S18: YES), the controller CON converts the NFC device from operating in the standby mode to operating in the active mode and performs the operation in the active mode as described above (S12).

When the communication fail count CFC exceeds the reference count RFC (S16: YES) or when the duration time SBT of the standby mode exceeds the reference time RFT (S19: YES), the controller CON changes the tag detection sensitivity TDS from the first sensitivity level LV1 to the second sensitivity level LV2 (S20) and the adaptive tag detector ATD performs the operation in the operation in the standby mode (S21), that is, the operation of the tag detection based on the tag detection sensitivity TDS of the second sensitivity level LV2. In some example embodiments, the controller CON may initialize the communication fail count CFC to zero if and/or when the controller CON changes the tag detection sensitivity TDS from the first sensitivity level LV1 to the second sensitivity level LV2.

If and/or when a tag is not detected based on the tag detection sensitivity TDS of the second sensitivity level LV2 (S22: NO), the adaptive tag detector ATD performs the operation in the standby mode as described above (S21) until a tag is detected (S22: YES).

If and/or when a tag is detected based on the tag detection sensitivity TDS of the second sensitivity level LV2 (S22: YES), the controller CON may convert the NFC device 10 from operating in the standby mode to operating in the active mode and performs the operation in the active mode as described above (S12). As described above, when the communication is successful (S13: YES), the controller CON initialize the tag detection sensitivity TDS and the communication fail count CFC (S11) and performs the operation in the active mode (S12). As a result, the controller CON may increase the tag detection sensitivity TDS from the second sensitivity level LV2 to the first sensitivity level LV1 if and/or when the communication succeeds after the tag is detected based on the tag detection sensitivity TDS of the second sensitivity level LV2.

Hereinafter, referring to example embodiments of FIGS. 5 through 22, the configurations and the operations of the NFC device according to some example embodiments are described. Some example embodiments of the tag detection are based on a change in a regulator current and the tag detection sensitivity TDS is described with reference to FIGS. 5 through 14 and some example embodiments of the tag detection are based on a change in an antenna voltage and the tag detection sensitivity TDS is described with reference to FIGS. 15 through 22.

Figure 5:
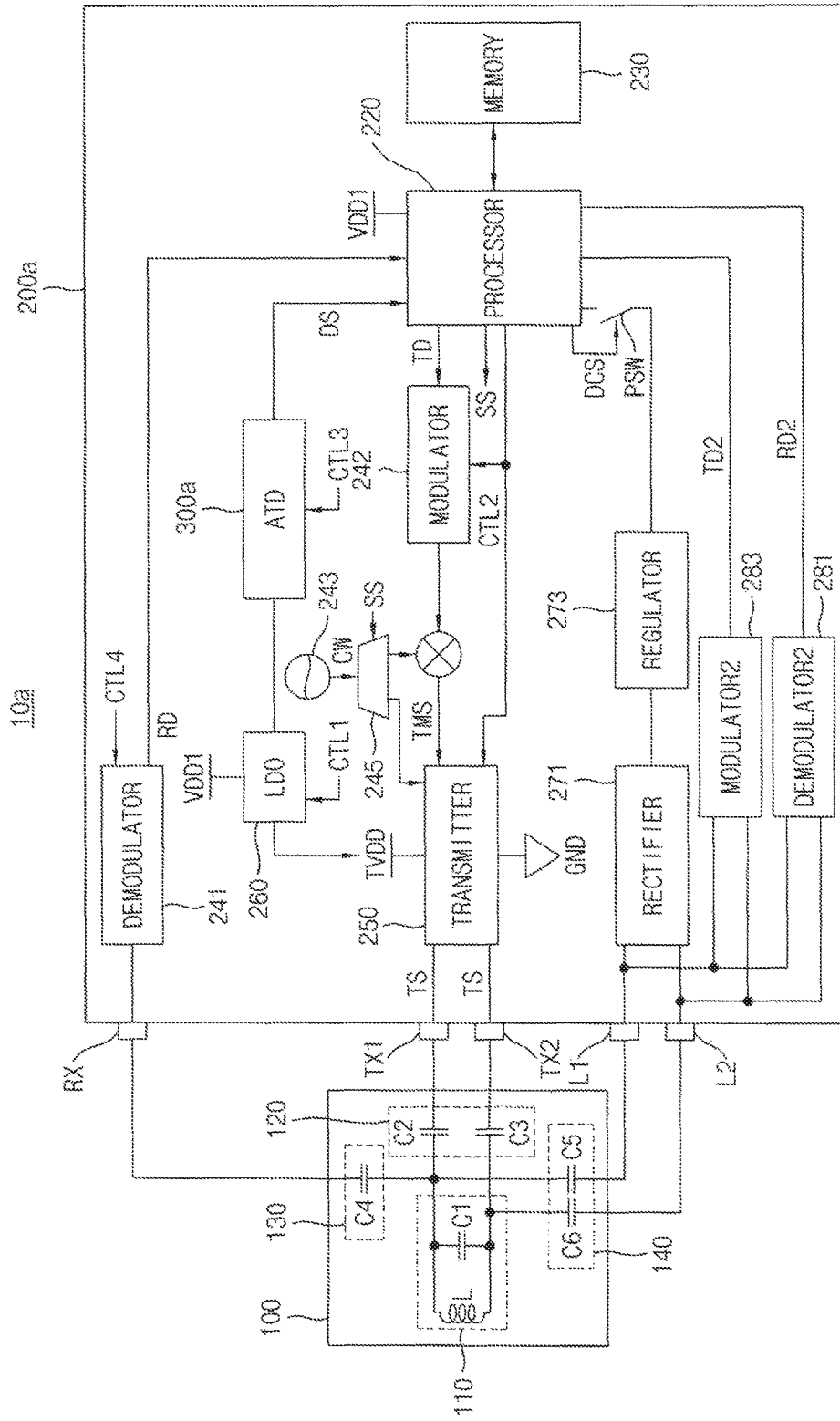
FIG. 5 is a block diagram illustrating an NFC device according to some example embodiments.

FIG. 5 is a block diagram illustrating an NFC device according to some example embodiments. Elements used to operate an NFC device 10a in the reader mode as well as elements used to operate the NFC device 10a in the card mode are illustrated in FIG. 5.

Referring to FIG. 5, the NFC device 10a includes a resonance unit 100 (also referred to herein as a resonator 100) and an NFC chip 200a.

The NFC chip 200a is coupled to the resonator 100 through a first power terminal L1, a second power terminal L2, a first transmission terminal TX1, a second transmission terminal TX2, and a reception terminal RX. The resonator 100 includes a resonance circuit 110 including an antenna L and a first capacitor C1, and a matching circuit 120 coupled to the resonance circuit 110, the first transmission terminal TX1 and the second transmission terminal TX2, and including a second capacitor C2 and a third capacitor C3 to perform an impedance matching. The resonator 100 further includes a first filter 130 coupled to the resonance circuit 110 and the reception terminal RX, and including a fourth capacitor C4, and a second filter 140 coupled to the resonance circuit 110, the first power terminal L1, and the second power terminal L2, and including a fifth capacitor C5 and a sixth capacitor C6. The configuration of the resonator 100 illustrated in FIG. 5 is an example only, and the configuration of the resonator 100 according to some example embodiments may not be limited to the above, but may be variously modified.

The NFC chip 200a may perform the signal transmission operation and the signal reception operation through the first power terminal L1 and the second power terminal L2 in the card mode, perform the signal transmission operation through the first transmission terminal TX1 and the second transmission terminal TX2 in the reader mode, and perform the signal reception operation through the reception terminal RX in the reader mode.

The NFC chip 200a includes a processor 220, a memory 230, a first demodulator 241, a first modulator 242, an oscillator 243, a mixer 244, a demultiplexer 245, a transmitter 250, a regulator 260, an adaptive tag detector 300a, a rectifier 271, a regulator 273, a power switch PSW, a second demodulator 281, and a second modulator 283.

The processor 220 may control the overall operation of the NFC chip 200a. The processor 220 may operate by receiving the first power supply voltage VDD1 from a power source, such as a battery.

If and/or when the signal reception operation is performed while the NFC device 10a is operating in the active mode (e.g., concurrently with the NFC device 10a operating in the active mode), the demodulator 241 generates reception data RD by demodulating the signal supplied from the resonator 100 through the reception terminal RX to provide the reception data RD to the processor 220. The processor 220 may store the reception data RD in the memory 230.

If and/or when the signal transmission operation is performed while the NFC device 10a is operating in the active mode, the processor 220 reads out transmission data TD from the memory 230 to provide the transmission data TD to the modulator 242, and the modulator 242 modulates the transmission data TD to provide a modulation signal. In addition, the oscillator 243 generates a carrier signal CW having a frequency corresponding to a carrier frequency (for example, 13.56 MHz), the demultiplexer 245 may provide the carrier signal CW to the mixer 244 in response to a selection signal SS, and the mixer 244 may combine the carrier signal CW with the modulated signal to generate a transmission modulation signal TMS.

In each of a preset phase and a detection phase of the standby mode, the demultiplexer 245 may provide the carrier signal CW to the transmitter 250 in response to the selection signal SS from the processor 220, and the transmitter 250 may generate a transmission signal TS based on the carrier signal CW to perform a detection operation for detecting an NFC tag.

The transmitter 250 is coupled between a transmission power supply voltage TVDD and a ground voltage GND. The transmitter 250 may receive the carrier signal CW from the demultiplexer 245 while the NFC device 10a is operating in the standby mode and generate the transmission signal TS corresponding to the carrier signal CW. In addition, the transmitter 250 may receive the transmission modulation signal TMS from the mixer 244 while the NFC device 10a is operating in the active mode, and the resonator 100 may generate the electromagnetic wave EMW corresponding to the transmission signal TS provided from the transmitter 250 through the first and second transmission terminals TX1 and TX2. For example, the transmitter 250 may allow the first and second transmit terminals TX1 and TX2 to be coupled to either the transmission power supply voltage TVDD through a pull-up load or the ground voltage GND through pull-down load based on the transmission modulation signal TMS while the NFC device 10a is operating in the active mode, so that the transmission signal TS may be provided to the resonator 102a through the first and second transmit terminals TX1 and TX2.

The processor 220 may provide the transmitter 250 with a control signal CTL2 having a plurality of bits indicating a mode and operation of the NFC device 10a based on the mode and the operation of the NFC device 10a. In addition, the processor 220 may control operation of the demodulator 241 by providing a control signal CTL4 to the demodulator 241.

The regulator 260 is coupled to the first power supply voltage VDD1 and may provide the transmission power supply voltage TVDD to the transmitter 250. The regulator 260 is implemented with a low drop-out (LDO) regulator and may adjust a level of the transmission power supply voltage TVDD in response to a control signal CTL1 from the processor 220. In addition, the processor 220 may receive an internal voltage through the power switch PSW. If and/or when the first power supply voltage VDD1 has a predetermined level or more, the processor 220 may operate by using the first power supply voltage VDD1 and disable a power control signal DCS to turn off the power switch PSW. If and/or when the first power supply voltage VDD1 has a level less than the predetermined level, the processor 220 enables the power control signal DCS to turn on the power switch PSW such that the processor 220 may be operated by using the internal voltage supplied from the regulator 273.

The adaptive tag detector 300a is coupled to the regulator 260, may monitor a current (regulator current) flowing in the regulator 260 if and/or when the electromagnetic wave EMW is radiated through the resonator 100 respectively in the preset phase and the detection phase, and may determine whether an NFC tag is within a communication range (e.g., communication coverage) of the NFC device 10a based on a comparison of a first sensing current in the preset phase and a second sensing current in the detection phase.

The adaptive tag detector 300a may determine whether the NFC tag is within a communication range of the NFC device 10a and may output a detection signal DS to the processor 220, which indicates whether the NFC tag is within a communication range of the NFC device 10a. The processor 220 may receive the detection signal DS and may determine an operation mode of the NFC device 10a based on a logic level of the detection signal DS.

When the NFC tag is out of the communication range of the NFC device 10a and the detection signal DS has a first logic level (logic low level), the processor 220 may maintain the operation mode of the NFC device 10a as the standby mode. If and/or when the NFC tag is within the communication range of the NFC device 10a and the detection signal DS has a second logic level (logic high level), the processor 220 may change the operation mode of the NFC device 10a from the standby mode to the active mode (e.g., convert the NFC device 10a from operating in the standby mode to operating in the active mode).

If and/or when the NFC device 10a is operating in the active mode, the processor 220 provides a control signal CTL2 to enable the modulator 242 and transmits a request command through the transmitter 250. The processor 220 provides the control signal CTL4 to enable the demodulator 241, and the demodulator 241 may await a response in response to the request command from the NFC tag during a predetermined time interval. If and/or when the response is received in response to the request command during the predetermined time interval, the NFC device 10a initiates data transmission/reception with the NFC tag. If and/or when the response is not received in response to the request command during the predetermined time interval, the processor 220 provides the control signals CTL2 and CTL4 to disable the modulator 242 and the demodulator 241, respectively, and provides the control signals CTL1 and CTL3 to the regulator 260 and the adaptive tag detector 300a, respectively, to perform above-described detection operation.

If and/or when the signal reception operation is performed in the card mode, the second demodulator 281 generates a second reception data RD2 by demodulating the signal supplied from the resonator 100 through the first and second power terminals L1 and L2 to provide the second reception data RD2 to the processor 220. The processor 220 may decode the second reception data RD2 and may store some or all of the second reception data RD2 in the memory 230.

When the signal transmission operation is performed in the card mode, the processor 220 may read out the output data from the memory 230 and encodes the output data to provide a second transmission data TD2 to the second modulator 283, and the second modulator 283 modulates the second transmission data TD2 to provide a modulation signal to the first and second power terminals L1 and L2.

Figure 6:
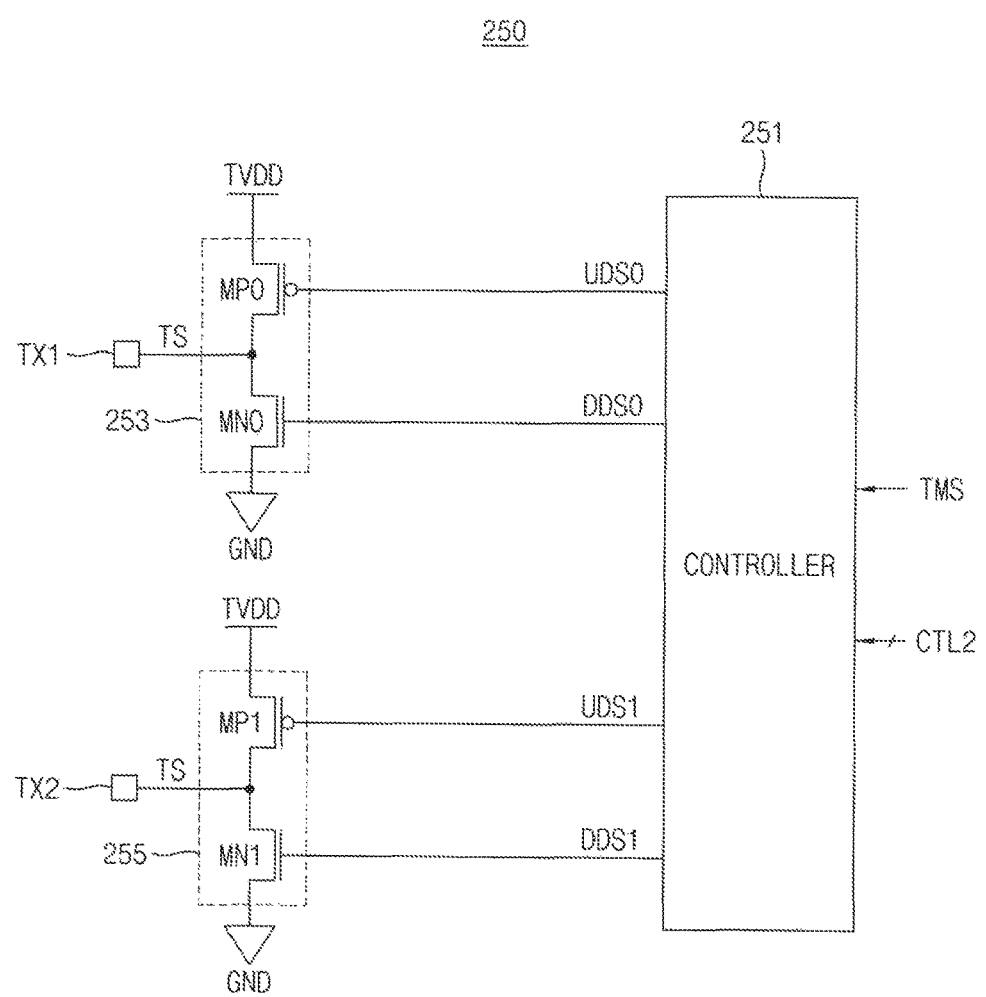
FIG. 6 is a block diagram illustrating a transmitter included in the NFC device of FIG. 5 according to some example embodiments.

FIG. 6 is a block diagram illustrating a transmitter included in the NFC device of FIG. 5 according to some example embodiments.

Referring to FIG. 6, a transmitter 250 includes a first driver 253, a second driver 255, and a controller 251. The first driver 253 includes a first pull-up transistor MP0 and a first pull-down transistor MN0, and the second driver 255 includes a second pull-up transistor MP1 and a second pull-down transistor MN1.

The first pull-up transistor MP0 and the second pull-up transistor MP1 may be p-channel metal oxide semiconductor (PMOS) transistors, and the first pull-down transistor MN0 and the second pull-down transistor MN1 may be n-channel metal oxide semiconductor (NMOS) transistors. The first pull-up transistor MP0 is coupled between the transmission supply voltage TVDD and the first transmission terminal TX1, and the first pull-down transistor MN0 is coupled between the first transmission terminal TX1 and the ground voltage GND. The second pull-up transistor MP1 is coupled between the transmission supply voltage TVDD and the second transmission terminal TX2, and the second pull-down transistor MN1 is coupled between the second transmission terminal TX2 and the ground voltage GND.

The controller 251 may drive the first pull-up transistor MP0 through a first pull-up driving signal UDS0, may drive the first pull-down transistor MN0 through a first pull-down driving signal DDS0, may drive the second pull-up transistor MP1 through a second pull-up driving signal UDS1, and may drive the second pull-down transistor MN1 through a second pull-down driving signal DDS1. The controller 251 may determine whether the NFC chip 200a is in the standby mode or the active mode based on the control signal CTL2 supplied from the processor 220. In the standby mode, the controller 251 may pull up the first driver 253 and pull down the second driver 255 based on the control signal CTL2 such that current from the transmission power supply voltage TVDD flows to the ground voltage GND through the first pull-up transistor MP0, the first transmission terminal TX1, the resonator 100, the second transmission terminal TX2, and the second pull-down transistor MN1, and the tag detector 300 may monitor the first sensing current and the second sensing current.

The controller 251 may selectively turn on one among the first pull-up transistor MP0 and the first pull-down transistor MN0 and one among the second pull-up transistor MP1 and the second pull-down transistor MN1 based on the transmission modulation signal TMS in the active mode. The transmitter 250 drives the first pull-up transistor MP0, the second pull-up transistor MP1, the first pull-down transistor MN0 and the second pull-down transistor MN1 based on the transmission modulation signal TMS in the active mode to perform the transmission operation to provide the transmission modulation signal TMS to the resonator 100.

Figure 7:
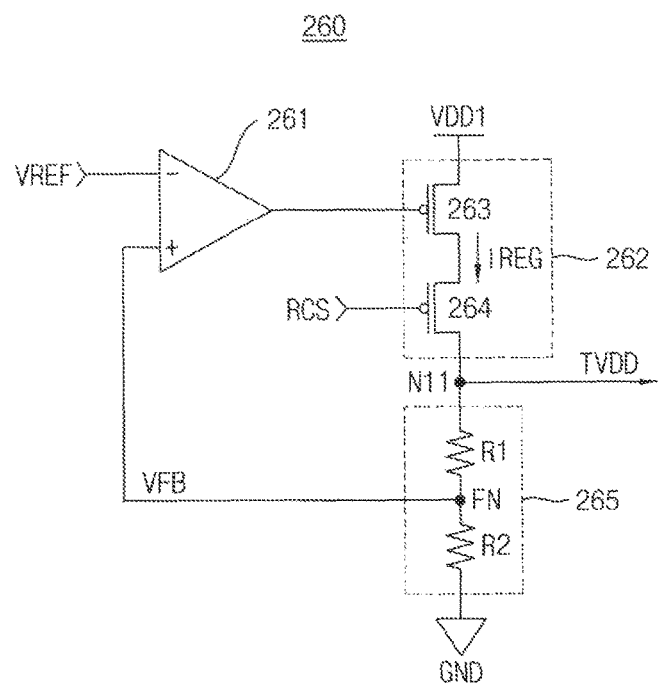
FIG. 7 is a block diagram illustrating a regulator included in the NFC device of FIG. 5 according to some example embodiments.

FIG. 7 is a block diagram illustrating a regulator included in the NFC device of FIG. 5 according to some example embodiments.

Referring to FIG. 7, the regulator 260 includes an operational amplifier 261, a current generator 262, and a feedback circuit 265.

The operational amplifier 261 includes a first (negative) input terminal receiving a reference voltage VREF, a second (positive) input terminal receiving a feedback voltage VFB, and an output terminal. The operational amplifier 261 compares the reference voltage VREF and the feedback voltage VFB to provide the current generator 262 with an output indicating a result of comparison of the reference voltage VREF and the feedback voltage VFB through the output terminal. The current generator 262 includes a first PMOS transistor 263 and a second PMOS transistor 264 that are coupled in series between the first power supply voltage VDD1 and an output node N11. The first PMOS transistor 263 includes a source coupled to the first power supply voltage VDD1, and a gate coupled to the output terminal of the operational amplifier 261. The second PMOS transistor 264 includes a source coupled to a drain of the first PMOS transistor 263, a gate receiving a regulator control signal RCS, and a drain coupled to the output node N11. The transmission power supply voltage TVDD that is applied to the transmitter 250 is output at the output node N11.

A regulator current IREG flows from the first power supply voltage VDD1 to the output node N11 through the first and second PMOS transistors 263 and 264, and a magnitude of the regulator current IREG may be adjusted according to the regulator control signal RCS that may be included in the control signal CTL1.

The feedback circuit 265 includes a first resistor R1 and a second resistor R2 coupled in series between the output node N11 and the ground voltage GND. The first and second resistors R1 and R2 are coupled to each other at a feedback node FN, and the feedback voltage VFB is provided to the second input terminal of the operational amplifier 261. The transmission power supply voltage TVDD is voltage-divided to the feedback voltage VFB by the first and second resistors R1 and R2.

Figure 8:
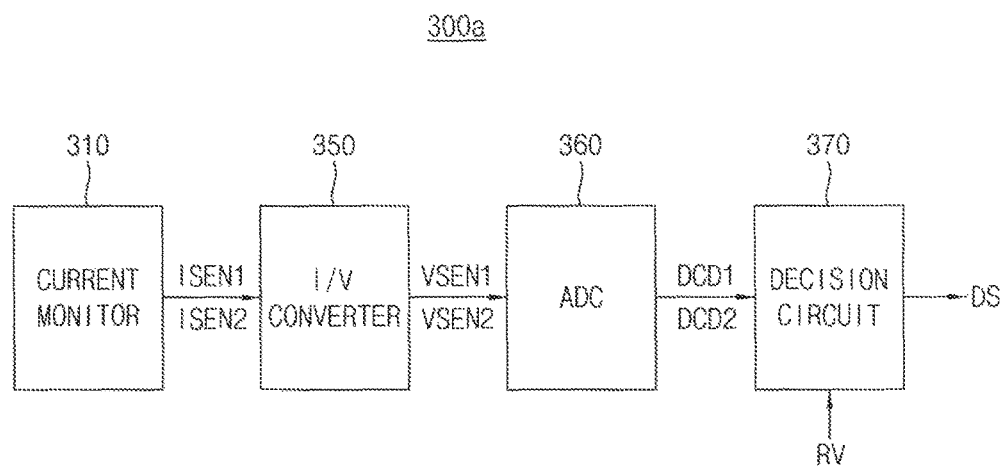
FIG. 8 is a block diagram illustrating an adaptive tag detector included in the NFC device of FIG. 5 according to some example embodiments.

FIG. 8 is a block diagram illustrating an adaptive tag detector included in the NFC device of FIG. 5 according to some example embodiments.

Referring to FIG. 8, the adaptive tag detector 300a includes a current monitor 310, a current to voltage (I/V) converter 350, an analog to digital converter (ADC) 360, and a decision circuit 370.

The current monitor 310 is coupled to the output terminal of the operational amplifier 261 and generates a first sensing current ISEN1 and a second sensing current ISEN2 by monitoring the regulator current IREG flowing in the regulator 260 respectively in the preset phase and in the detection phase. The I/V converter 350 converts the first sensing current ISEN1 and the second sensing current ISEN2 to a first sensing voltage VSEN1 and a second sensing voltage VSEN2, respectively, in the preset phase and in the detection phase. The ADC 360 converts the first sensing voltage VSEN1 and the second sensing voltage VSEN2 to a first digital code DCD1 and a second digital code DCD2, respectively, in the preset phase and in the detection phase. The decision circuit 370 outputs the detection signal DS to the processor 220, which indicates that the NFC tag is within a communication range of the NFC device 10a, based on the first digital code DCD1, the second digital code DCD2 and a reference value indicating the tag detection sensitivity TDS.

Figure 9:
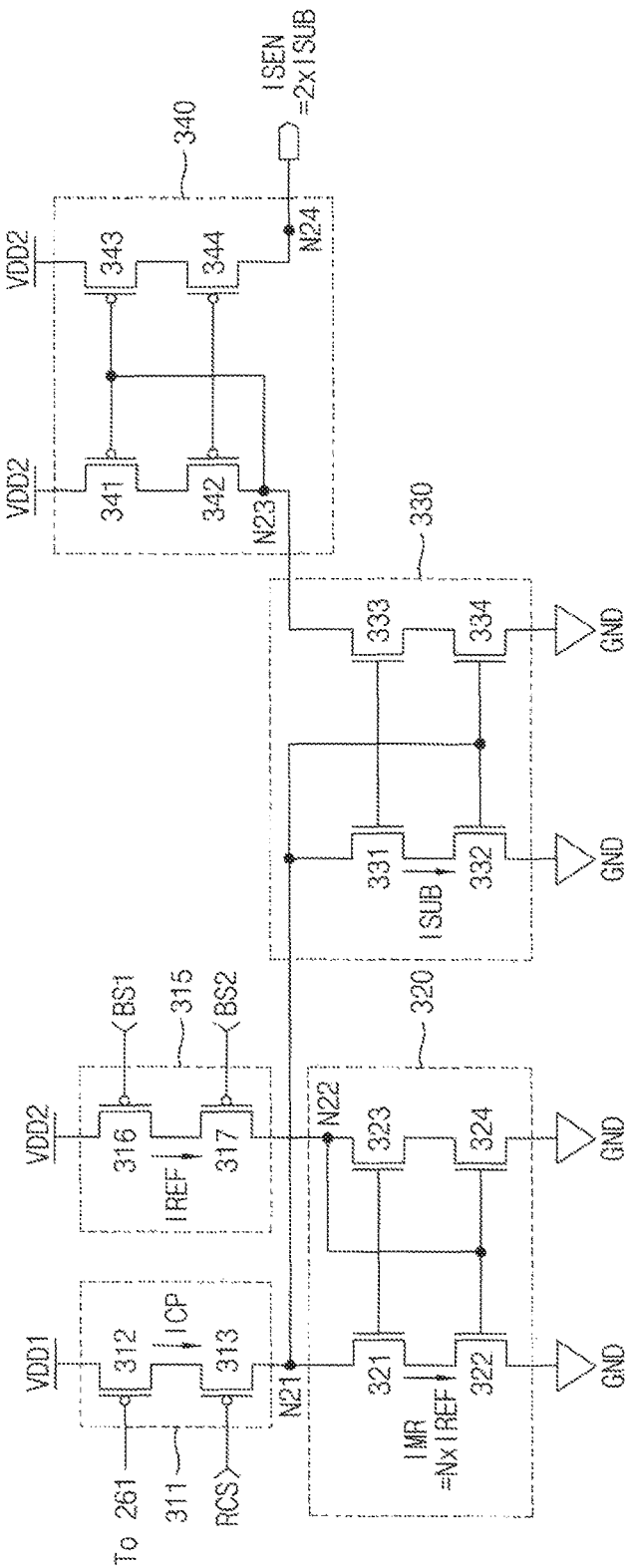
FIG. 9 is a circuit diagram illustrating a current monitor included in the adaptive tag detector of FIG. 8 according to some example embodiments.

FIG. 9 is a circuit diagram illustrating a current monitor included in the adaptive tag detector of FIG. 8 according to some example embodiments.

Referring to FIG. 9, the current monitor 310 includes a first current generator 311, a reference current generator 315, a second current generator 320, a third current generator 330, and a fourth current generator 340. The first current generator 311 is coupled between the first power supply voltage VDD1 and a first node N21, is to the output terminal of the regulator 260, and generates a first current ICP that is substantially the same (e.g., the same within manufacturing tolerances and/or material tolerances) as the regulator current IREG. The reference current generator 315 is coupled between a second power supply voltage VDD2 and a second node N22, and generates a reference current IREF. The second current generator 320 is coupled between the first node N21, the second node N22, and the ground voltage GND, and generates a second current IMR (=N*IREF) that is N times greater than the reference current IREF. N may be a positive real number. The third current generator 330 is coupled between the first node N21, a third node N23, and the ground voltage GND, and generates a third current ISUB corresponding to a difference between the first current ICP and the second current IMR. Therefore, a relationship between the third current ISUB, the first current ICP, and the second current IMR may be ISUB=ICP−N*IREF. The fourth current generator 340 is coupled between the second power supply voltage VDD2, the third node N23, and an output node N24, and generates a sensing current ISEN that is two times greater than the third current ISUB. Therefore, a relationship between the sensing current ISEN and the third current ISUB is ISEN=2*ISUB. A level of the first power supply voltage VDD1 may be greater than a level of the second power supply voltage VDD2.

The first current generator 311 includes a first PMOS transistor 312 and a second PMOS transistor 313. The first PMOS transistor 312 includes a source coupled to the first power supply voltage VDD1, and a gate coupled to an output terminal of the operational amplifier 261 of the regulator 260. The second PMOS transistor 313 includes a source coupled to a drain of the first PMOS transistor 312, a gate receiving the regulator control signal RCS, and a drain coupled to the first node N21. The first current ICP flows from the first power supply voltage VDD1 to the first node N21.

The reference current generator 315 includes a first PMOS transistor 316 and a second PMOS transistor 317. The first PMOS transistor 316 includes a source coupled to the second power supply voltage VDD2, and a gate receiving the first bias signal BS1. The second PMOS transistor 317 includes a source coupled to a drain of the first PMOS transistor 316, a gate receiving the second bias signal BS2, and a drain coupled to the second node N22. The reference current IREF flows from the second power supply voltage VDD2 to the second node N22.

The second current generator 320 includes first through fourth NMOS transistors 321-324. The first NMOS transistor 321 includes a drain coupled to the first node N21. The second NMOS transistor 322 includes a drain coupled to a source of the first NMOS transistor 321, and a source coupled to the ground voltage GND. The third NMOS transistor 323 includes a drain coupled to the second node N22, and a gate coupled to a gate of the first NMOS transistor 321. The fourth NMOS transistor 324 includes a drain coupled to a source of the third NMOS transistor 323, a drain coupled to the ground voltage GND, and a gate coupled to a gate of the second NMOS transistor 322. The gate of the fourth NMOS 324 transistor is coupled to the second node N22, and the second current N*IREF flows from the first node N21 to the ground voltage GND through the first and second NMOS transistors 321 and 322.

The third current generator 330 includes first through fourth NMOS transistors 331-334. The first NMOS transistor 331 includes a drain coupled to the first node N21. The second NMOS transistor 332 includes a drain coupled to a source of the first NMOS transistor 331, and a source coupled to the ground voltage GND. The third NMOS transistor 333 includes a drain coupled to the third node N23, and a gate coupled to a gate of the first NMOS transistor 331. The fourth NMOS transistor 334 includes a drain coupled to a source of the third NMOS transistor 333, a source coupled to the ground voltage GND, and a gate coupled to a gate of the second NMOS transistor 332. The gate of the fourth NMOS transistor 334 is coupled to the first node N21, and the third current ISUB flows from the first node N21 to the ground voltage GND through the first and second NMOS transistors 331 and 332.

The fourth current generator 340 includes first through fourth PMOS transistors 341-344. The first PMOS transistor 341 includes a source coupled to the second power supply voltage VDD2. The second PMOS transistor 342 includes a source coupled to a drain of the first PMOS transistor 341, and a drain coupled to the third node N23. The third PMOS transistor 343 includes a source coupled to the second power supply voltage VDD2, and a gate coupled to a gate of the first PMOS transistor 341. The fourth PMOS transistor 344 includes a source coupled to a drain of the third PMOS transistor 343, a drain coupled to the output node N24, and a gate coupled to a gate of the second PMOS transistor 342. The gate of the third PMOS transistor 343 is coupled to the third node, and the sensing current ISEN from the second power supply voltage VDD2 through the third and fourth PMOS transistors 343 and 344 is output at the output node N24.

The second current ISUB may correspond to ICP (=IREG)−N*IREF, and the sensing current ISEN may correspond to 2*(IREG−N*IREF). Because a value of the N*IREF is known, the regulator current IREG may be monitored using the sensing current ISEN. In addition, because the sensing current ISEN may correspond to 2*(IREG−N*IREF), the sensing current ISEN increases as the regulator current IREG increases.

Therefore, the current monitor 310 may output the first sensing current ISEN1 in the preset phase of the standby mode and may output the second sensing current ISEN2 in the detection phase of the standby mode.

Figure 10:
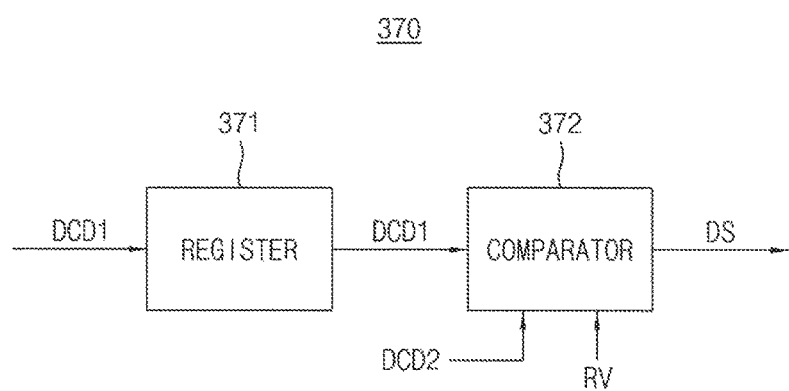
FIG. 10 is a diagram illustrating a decision circuit included in the adaptive tag detector of FIG. 8 according to some example embodiments.

FIG. 10 is a diagram illustrating a decision circuit included in the adaptive tag detector of FIG. 8 according to some example embodiments.

Referring to FIG. 10, the decision circuit 370 includes a register 371 and a digital comparator 372.

The register 371 may store the first digital code DCD1 provided from the ADC 360 in the preset phase of the standby mode. The digital comparator 372 may compare the first digital code DCD1 stored in the register 371 and the second digital code DCD2 provided from the ADC 360 in the detection phase of the standby mode to output the detection signal DS to the processor 220, which indicates whether the NFC tag is within the communication range of the NFC device 10a. If and/or when the NFC tag is within the communication range of the NFC device 10a, the second digital code DCD2 is greater than the first digital code DCD1.

In example embodiments, the decision circuit 370 may be included in the processor 220 instead of the adaptive tag detector 300a. In this case, the adaptive tag detector 300a outputs the first digital code DCD1 to the processor 220 in the preset phase of the standby mode and outputs the second digital code DCD2 to the processor 220 in the detection phase of the standby mode.

Figure 11:
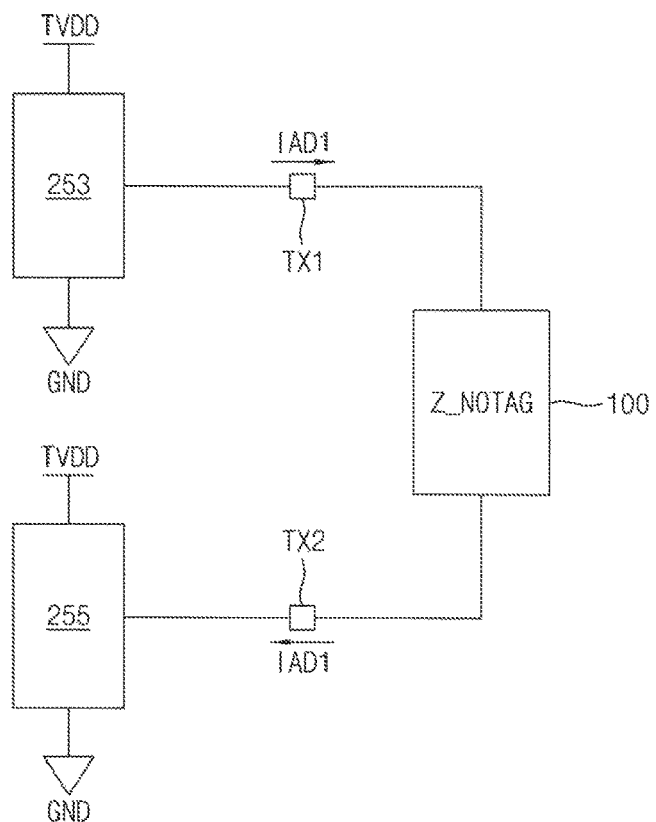
FIG. 11 and FIG. 12 are diagrams for describing tag detection during a standby mode of the NFC device of FIG. 5 according to some example embodiments.
Figure 12:
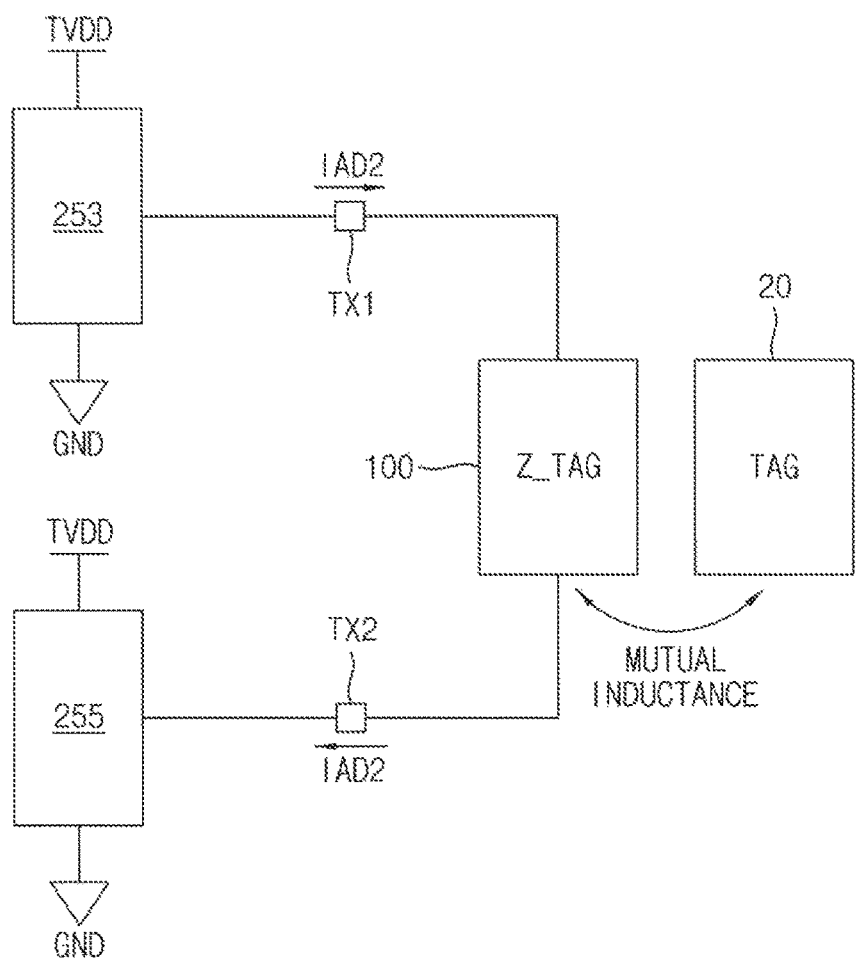

FIGS. 11 and 12 are diagrams for describing tag detection during a standby mode of the NFC device of FIG. 5 according to some example embodiments.

FIG. 11 illustrates an example that the NFC tag 20 is out of the communication range of the NFC device 10a, and FIG. 12 illustrates an example that the NFC tag 20 is within the communication range of the NFC device 10a.

Referring to FIGS. 5 through 11, when the NFC tag 20 is out of the communication range of the NFC device 10a, a first driver current IAD1 flows from the first driver 253 of the transmitter 250, through the first transmission terminal TX1, the resonator 100, and the second transmission terminal TX2, to the second driver 255 of the transmitter 250. In this case, an impedance of the resonator 100 corresponds to Z_NOTAG.

Referring to FIGS. 5 through 10 and 12, when the NFC tag 20 is within the communication range of the NFC device 10a, a second driver current IAD2 flows from the first driver 253 of the transmitter 250, through the first transmission terminal TX1, the resonator 100, and the second transmission terminal TX2, to the second driver 255 of the transmitter 250. In this case, the resonator 100 interacts with the resonator of the NFC tag 20, that is, mutual inductance occurs between the resonator 100 of the NFC device 10a and the resonator of the NFC tag 20, and the impedance of the resonator 100, corresponding to Z_TAG, decreases compared to the impedance of Z_NOTAG. Therefore, the second driver current IAD2 is greater than the first driver current IAD1. If and/or when the second driver current IAD2 increases, the regulator current IREG also increases, and the sensing current ISEN also increases. Therefore, it is determined whether the NFC tag 20 is within the communication range of the NFC device 10a by monitoring changes of the regulator current IREG.

Figure 13:
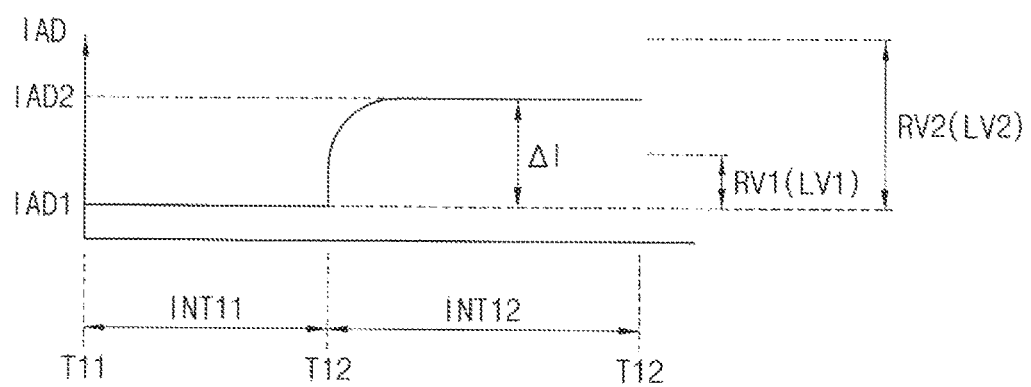
FIG. 13 is a graph illustrating a change of a driver current as an NFC tag approaches an NFC reader according to some example embodiments.

FIG. 13 is a graph illustrating a change of a driver current as an NFC tag approaches an NFC reader according to some example embodiments.

Referring to FIG. 13, the first driver current IAD1 in a first interval INT11 between time points T11 and T12 when the NFC tag 20 is out of the communication range of the NFC device 10a as in FIG. 11 is smaller than the second driver current IAD2 in a second interval INT12 between time points T12 and T13 when the NFC tag 20 is within the communication range of the NFC device 10a as in FIG. 12. Therefore, the adaptive tag detector 300a may determine whether the NFC tag 20 is within the communication range of the NFC device 10a by detecting a difference ΔI between the second driver current IAD2 and the first driver current IAD1. In FIG. 13, a first reference value RV1 corresponds to the first sensitivity level LV1 of the tag detection sensitivity TDS that is relatively high and a second reference value RV2 corresponds to the second sensitivity level LV2 of the tag detection sensitivity TDS that is relatively low. In other words, the reference value RV may be increased as the tag detection sensitivity TDS is decreased.

The difference ΔI between the second driver current IAD2 and the first driver current IAD1 is larger than the first reference value RV1 and smaller than the second reference value RV2. Accordingly, it is determined that the NFC tag 20 is within the communication range of the NFC device 10a when the tag detection sensitivity TDS is set to the first sensitivity level LV1 that is relatively high, whereas it is determined that the NFC tag 20 is out of the communication range of the NFC device 10a when the tag detection sensitivity TDS is set to the second sensitivity level LV2 that is relatively low. As such, the power consumption and the tag detection range may be optimized by controlling the tag detection sensitivity TDS.

Figure 14:
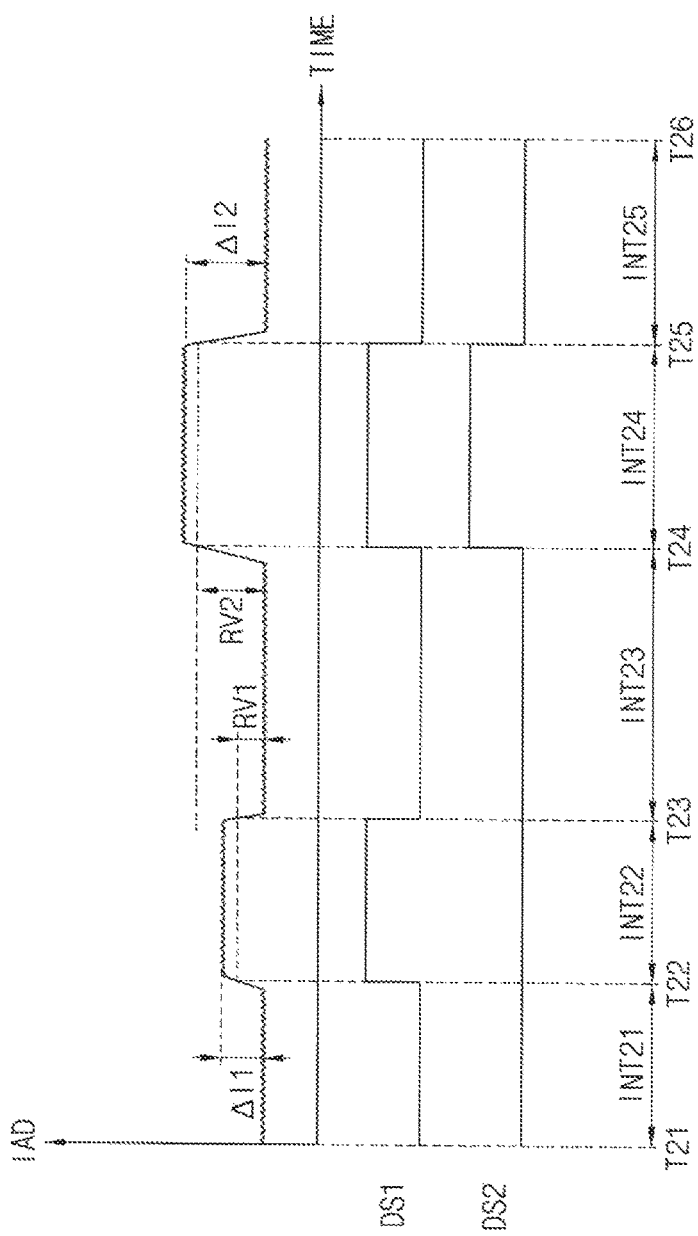
FIG. 14 is a diagram illustrating tag detection based on a driver current and a tag detection sensitivity according to some example embodiments.

FIG. 14 is a diagram illustrating tag detection based on a driver current and a tag detection sensitivity according to some example embodiments.

Referring to FIG. 14, the driver current IAD during a second interval INT22 between time points T22~T23 and a fourth interval INT24 between time points T24~T25 is increased in comparison with the driver current IAD during a first interval INT21 between time points T21~T22, a third interval INT23 between time points T23~T24 and a fifth interval INT25 between time points T25~T26. The driver current IAD during the fourth interval INT24 is further increased than the driver current IAD during the second interval INT22. Accordingly it is determined that the NFC tag 20 approaches the NFC device 10a during the second interval INT22 and approaches further near the NFC device 10a during the fourth interval INT24.

The first detection signal DS1 corresponds to a first case when the tag detection sensitivity TDS is set to the higher, first sensitivity level LV1 corresponding to the first reference value RV1, and the second detection signal DS2 corresponds to a second case when the tag detection sensitivity TDS is set to the lower, second sensitivity level LV2 corresponding to the second reference value RV2. As a result, the first detection signal SD1 corresponds to the first case of the wider tag detection range and the second detection signal SD2 corresponds to the second case of the narrower tag detection range.

As shown by the first detection signal DS1, it is determined that the NFC tag 20 is within the communication range of the NFC device 10a even though the NFC tag 20 is relatively far from the NFC device 10a. However, as shown by the second detection signal DS2, it is determined that the NFC tag 20 is out of the communication range of the NFC device 10a when the NFC tag 20 is relatively far from the NFC device 10a.

Figure 15:
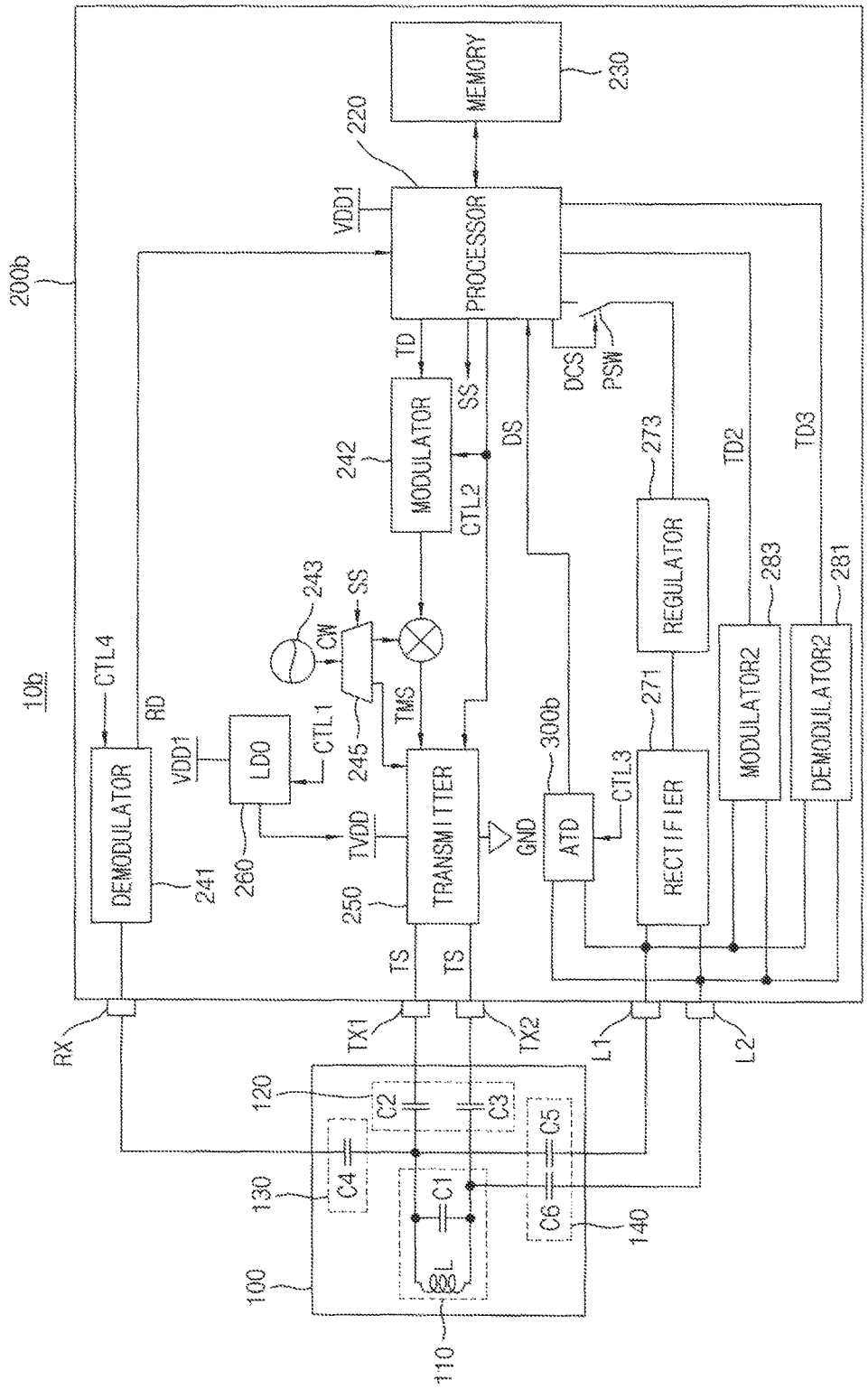
FIG. 15 is a block diagram illustrating an NFC device according to some example embodiments.

FIG. 15 is a block diagram illustrating an NFC device according to some example embodiments.

Referring to FIG. 15, the NFC device 10b includes a resonance unit or a resonator 100 and an NFC chip 200b. The NFC chip 200b includes a processor 220, a memory 230, a first demodulator 241, a first modulator 242, an oscillator 243, a mixer 244, a demultiplexer 245, a transmitter 250, a regulator 260, an adaptive tag detector 300b, a rectifier 271, a regulator 273, a power switch PSW, a second demodulator 281, and a second modulator 283.

The NFC device 10b of FIG. 15 is substantially the same (e.g., the same within manufacturing tolerances and/or material tolerances) as the NFC device 10a of FIG. 5, except the adaptive tag detector 300b, and thus the repeated descriptions are omitted.

The adaptive tag detector 300b is coupled to first power terminal L1 and the second power terminal L2, may monitor an antenna voltage between the first and second power terminals L1 and L2 when the electromagnetic wave EMW is radiated through the resonator 100 respectively in the preset phase and the detection phase, and may determine whether an NFC tag is within a communication range or coverage of the NFC device 10b based on a comparison of a first antenna voltage in the preset phase and a second antenna voltage in the detection phase.

Figure 16:
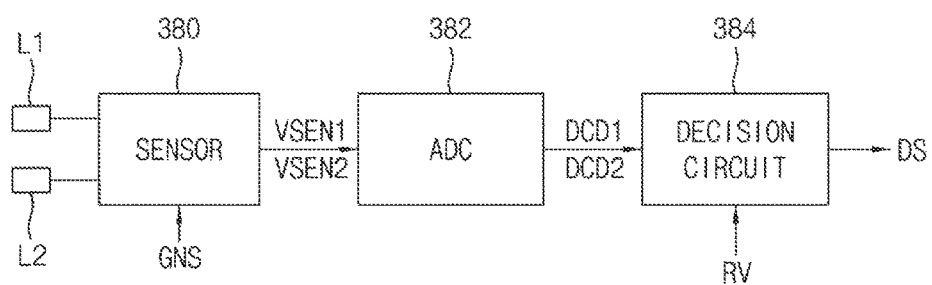
FIG. 16 is a block diagram illustrating an adaptive tag detector included in the NFC device of FIG. 15 according to some example embodiments.

FIG. 16 is a block diagram illustrating an adaptive tag detector included in the NFC device of FIG. 15 according to some example embodiments.

Referring to FIG. 16, the adaptive tag detector 300b includes a sensor 380, an analog-to-digital conversion unit ADC 382 and a decision circuit 384.

The sensor 380 generates a first sensing voltage VSEN1 and a second sensing voltage VSEN2 by monitoring the antenna voltage received from the resonance unit 100 through the first power electrode L1 and the second power electrode L2 respectively in the preset phase and in the detection phase. For example, the sensor 380 may generate the sensing voltages VSEN1 and VSEN2 proportional to the magnitude of the antenna voltage VAN and a gain signal GNS provided by the processor 220. The ADC 382 converts the first sensing voltage VSEN1 and the second sensing voltage VSEN2 to a first digital code DCD1 and a second digital code DCD2, respectively, in the preset phase and in the detection phase. The decision circuit 384 outputs the detection signal DS to the processor 220, which indicates that the NFC tag is within a communication range of the NFC device 10b, based on the first digital code DCD1, the second digital code DCD2 and a reference value indicating the tag detection sensitivity TDS.

The ADC 382 and the decision circuit 384 are substantially the same (e.g., the same within manufacturing tolerances and/or material tolerances) as the above described ADC 360 and the decision circuit 370, and thus the repeated descriptions are omitted.

Figure 17:
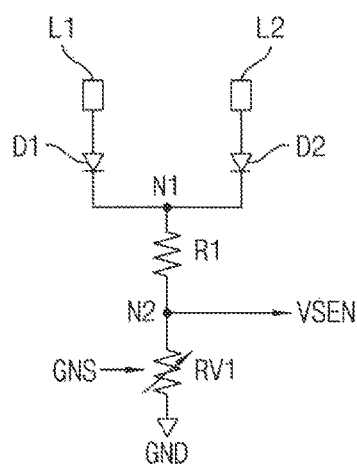
FIG. 17 is a diagram illustrating a sensor included in the adaptive tag detector of FIG. 16 according to some example embodiments.

FIG. 17 is a diagram illustrating a sensor included in the adaptive tag detector of FIG. 16 according to some example embodiments.

Referring to FIG. 17, a sensor 380a may include a rectification circuit having a first diode D1 and a second diode D2, a first resistor R1 and a first variable resistor RV1.

The first diode D1 may be coupled between the first power electrode L1 and a first node N1, and the second diode D2 may be coupled between the second power electrode L2 and the first node N1. As a result, the rectification circuit may rectify the antenna voltage VAN received through the first power electrode L1 and the second power electrode L2 to generate a rectified voltage. The first resistor R1 may be coupled between the first node N1 and a second node N2, and the first variable resistor RV1 may be coupled between the second node N2 and the ground voltage GND. The first variable resistor RV1 may have a resistance corresponding to the gain signal GNS. Since the first resistor R1 and the first variable resistor RV1 operate as a voltage divider that divides the rectified voltage, the sensor 271a may convert the antenna voltage VAN to the sensing voltage VSEN based on the gain signal GNS, and output the sensing voltage VSEN through the second node N2.

Figure 18:
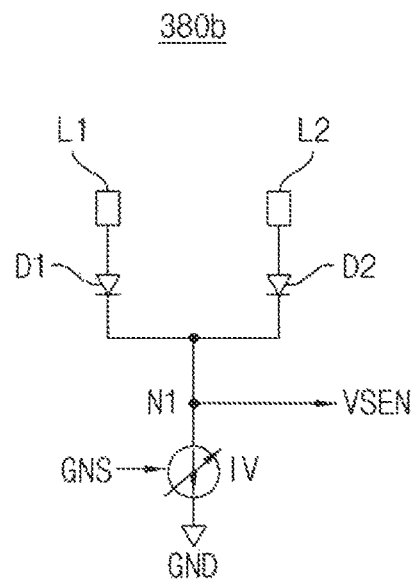
FIG. 18 is a diagram illustrating a sensor included in the adaptive tag detector of FIG. 16 according to some example embodiments.

FIG. 18 is a diagram illustrating a sensor included in the adaptive tag detector of FIG. 16 according to some example embodiments.

Referring to FIG. 18, a sensor 380b may include a rectification circuit having a first diode D1 and a second diode D2, and a variable current source IV.

The first diode D1 may be coupled between the first power electrode L1 and a first node N1, and the second diode D2 may be coupled between the second power electrode L2 and the first node N1. As a result, the rectification circuit may rectify the antenna voltage VAN received through the first power electrode L1 and the second power electrode L2 to generate a rectified voltage. The variable current source IV may be coupled between the first node N1 and the ground voltage GND. The variable current source IV may generate a current having a magnitude corresponding to the gain signal GNS. Since a magnitude of the rectified voltage is varied according to a magnitude of the current generated from the variable current source IV, the sensor 271b may convert the antenna voltage VAN to the sensing voltage VSEN based on the gain signal GNS, and output the sensing voltage VSEN through the first node N1.

Figure 19:
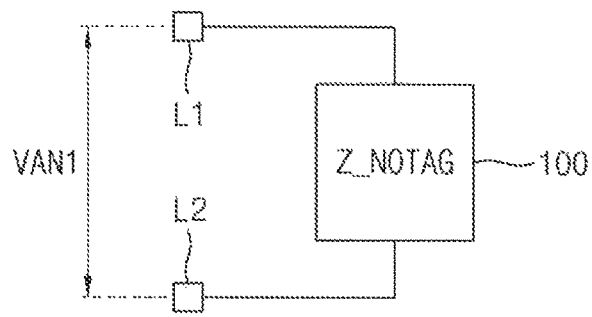
FIG. 19 and FIG. 20 are diagrams for describing tag detection during a standby mode of the NFC device of FIG. 15.
Figure 20:
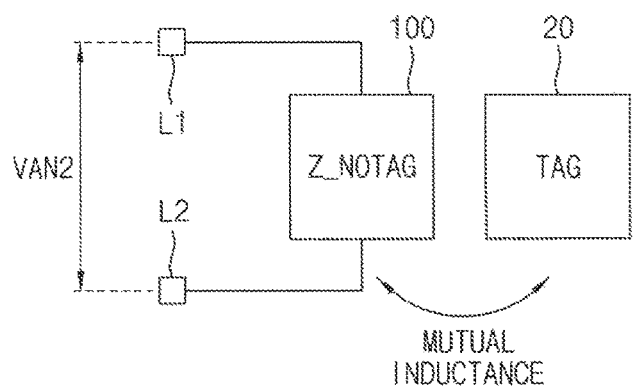

FIGS. 19 and 20 are diagrams for describing tag detection during a standby mode of the NFC device of FIG. 15 according to some example embodiments.

Referring to FIGS. 15 through 19, when the NFC tag 20 is out of the communication range of the NFC device 10b (e.g., outside a threshold proximity range), a first antenna voltage VAN1 is applied between the first and second power terminals L1 and L2. In this case, an impedance of the resonator 100 corresponds to Z_NOTAG.

Referring to FIGS. 15 through 18 and 20, when the NFC tag 20 is within the communication range of the NFC device 10b, a second antenna voltage VAN2 is applied between the first and second power terminals L1 and L2. In this case, the resonator 100 interacts with the resonator of the NFC tag 20, that is, mutual inductance occurs between the resonator 100 of the NFC device 10b and the resonator of the NFC tag 20, and the impedance of the resonator 100, corresponding to Z_TAG, decreases compared to the impedance of Z_NO-TAG. Therefore, the second antenna voltage VAN2 is lower than the first antenna voltage VAN1. If and/or when the second antenna voltage VSEN2 decreases, also the sensing current VSEN2 also decreases compared to the first sensing voltage VSEN1. Therefore, it is determined whether the NFC tag 20 is within the communication range of the NFC device 10a by monitoring changes of the antenna voltage VAN.

Figure 21:
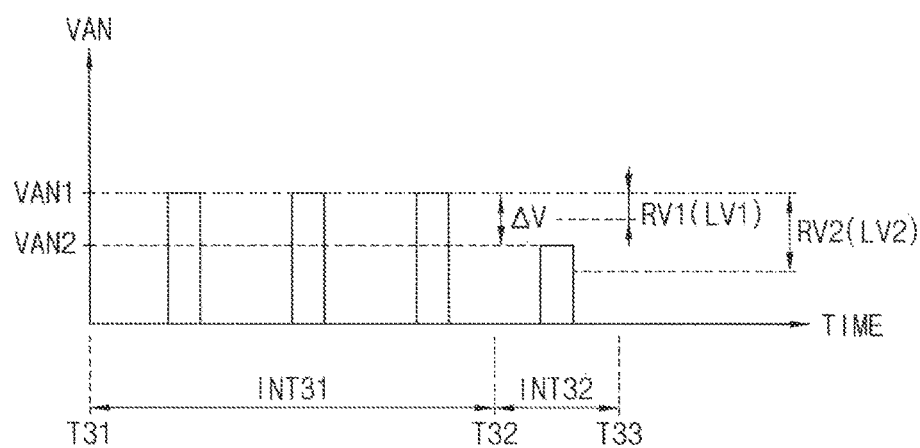
FIG. 21 is a graph illustrating a change of an antenna voltage as an NFC tag approaches an NFC reader according to some example embodiments.

FIG. 21 is a graph illustrating a change of an antenna voltage as an NFC tag approaches an NFC reader according to some example embodiments.

Referring to FIG. 21, the first antenna voltage VAN1 in a first interval INT31 between time points T31 and T32 when the NFC tag 20 is out of the communication range of the NFC device 10b as in FIG. 19 is greater than the second antenna voltage VAN2 in a second interval INT32 between time points T32 and T33 when the NFC tag 20 is within the communication range of the NFC device 10b as in FIG. 20. Therefore, the adaptive tag detector 300b may determine whether the NFC tag 20 is within the communication range of the NFC device 10b by detecting a difference ΔV between the second antenna voltage VAN1 and the second antenna voltage VAN2. In FIG. 21, a first reference value RV1 corresponds to the first sensitivity level LV1 of the tag detection sensitivity TDS that is relatively high and a second reference value RV2 corresponds to the second sensitivity level LV2 of the tag detection sensitivity TDS that is relatively low. In other words, the reference value RV may be increased as the tag detection sensitivity TDS is decreased.

The difference ΔV between the second antenna voltage VAN1 and the second antenna voltage VAN2 is larger than the first reference value RV1 and smaller than the second reference value RV2. Accordingly, it is determined that the NFC tag 20 is within the communication range of the NFC device 10a when the tag detection sensitivity TDS is set to the first sensitivity level LV1 that is relatively high, whereas it is determined that the NFC tag 20 is out of the communication range of the NFC device 10a when the tag detection sensitivity TDS is set to the second sensitivity level LV2 that is relatively low. As such, the power consumption and the tag detection range may be optimized by controlling the tag detection sensitivity TDS.

Figure 22:
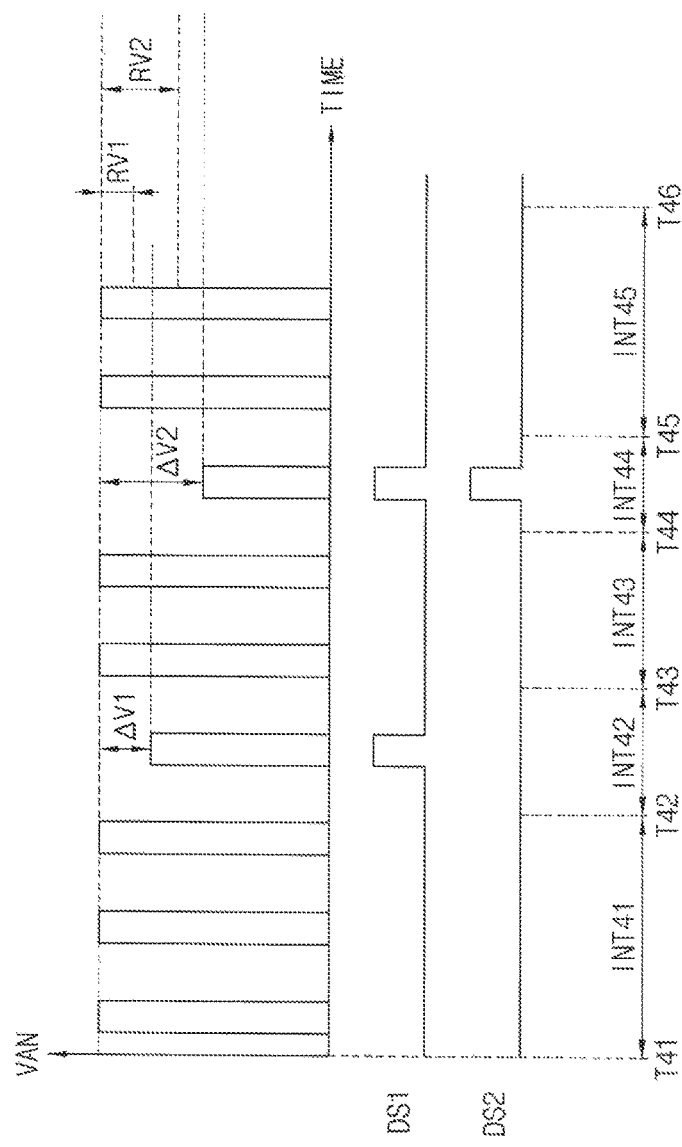
FIG. 22 is a diagram illustrating tag detection based on an antenna voltage and a tag detection sensitivity according to some example embodiments.

FIG. 22 is a diagram illustrating tag detection based on an antenna voltage and a tag detection sensitivity associated with an NFC device according to some example embodiments.

Referring to FIG. 22, the antenna voltage VAN during a second interval INT42 between time points T42~T43 and a fourth interval INT44 between time points T44~T45 is decreased in comparison with the antenna voltage VAN during a first interval INT41 between time points T41~T42, a third interval INT43 between time points T43~T44 and a fifth interval INT45 between time points T45~T46. The antenna voltage VAN during the fourth interval INT44 is further decreased than the antenna voltage VAN during the second interval INT42. Accordingly it is determined that the NFC tag 20 approaches the NFC device 10b during the second interval INT42 and approaches further near the NFC device 10b during the fourth interval INT44.

The first detection signal DS1 corresponds to a first case when the tag detection sensitivity TDS is set to the higher, first sensitivity level LV1 corresponding to the first reference value RV1, and the second detection signal DS2 corresponds to a second case when the tag detection sensitivity TDS is set to the lower, second sensitivity level LV2 corresponding to the second reference value RV2. As a result, the first detection signal SD1 corresponds to the first case of the wider tag detection range and the second detection signal SD2 corresponds to the second case of the narrower tag detection range.

As shown by the first detection signal DS1, it is determined that the NFC tag 20 is within the communication range of the NFC device 10a even though the NFC tag 20 is relatively far from the NFC device 10b. However, as shown by the second detection signal DS2, it is determined that the NFC tag 20 is out of the communication range of the NFC device 10a when the NFC tag 20 is relatively far from the NFC device 10b.

Figure 23:
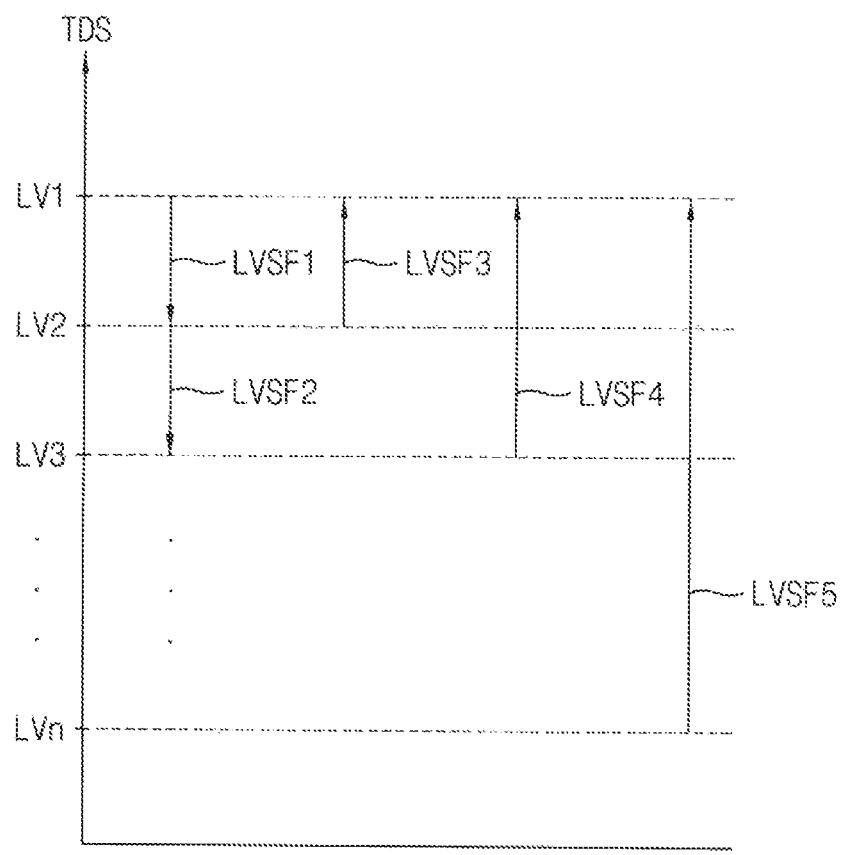
FIG. 23 is a conceptual diagram illustrating control of a tag detection sensitivity associated with an NFC device according to some example embodiments.

FIG. 23 is a conceptual diagram illustrating control of a tag detection sensitivity according to some example embodiments.

Referring to FIG. 23, a tag detection sensitivity TDS may be shifted between first through n-th level LV1 through LVn based on one or more user environment parameters associated with the NFC device during a standby mode for reducing power consumption. If the one or more user environment parameters associated with the NFC device change such that the probability of the communication to be performed by the NFC device is decreased, level down operations LVSF1 and LVSF2 may be performed to progressively decrease the tag detection sensitivity TDS from the maximum sensitivity level (e.g., LV1) to and/or through one or more sensitivity levels of a plurality of lower sensitivity levels LV2~LVn sequentially based on the one or more user environment parameters associated with the NFC device. In contrast, if the one or more user environment parameters associated with the NFC device change such that the probability of the communication to be performed by the NFC device is increased, for example, when communication with a detected NFC tag succeeds, level up operations LVSF3, LVSF4 and LVSF5 may be performed to increase the tag detection sensitivity TDS from each of the lower sensitivity levels LV2~LVn directly to the maximum sensitivity level (e.g., LV1).

As such, the tag detection sensitivity may be controlled ('adjusted') adaptively between a plurality of levels LV1~LVn based on the one or more user environment parameters associated with the NFC device to further optimize the power consumption and the tag detection range.

Figure 24A:
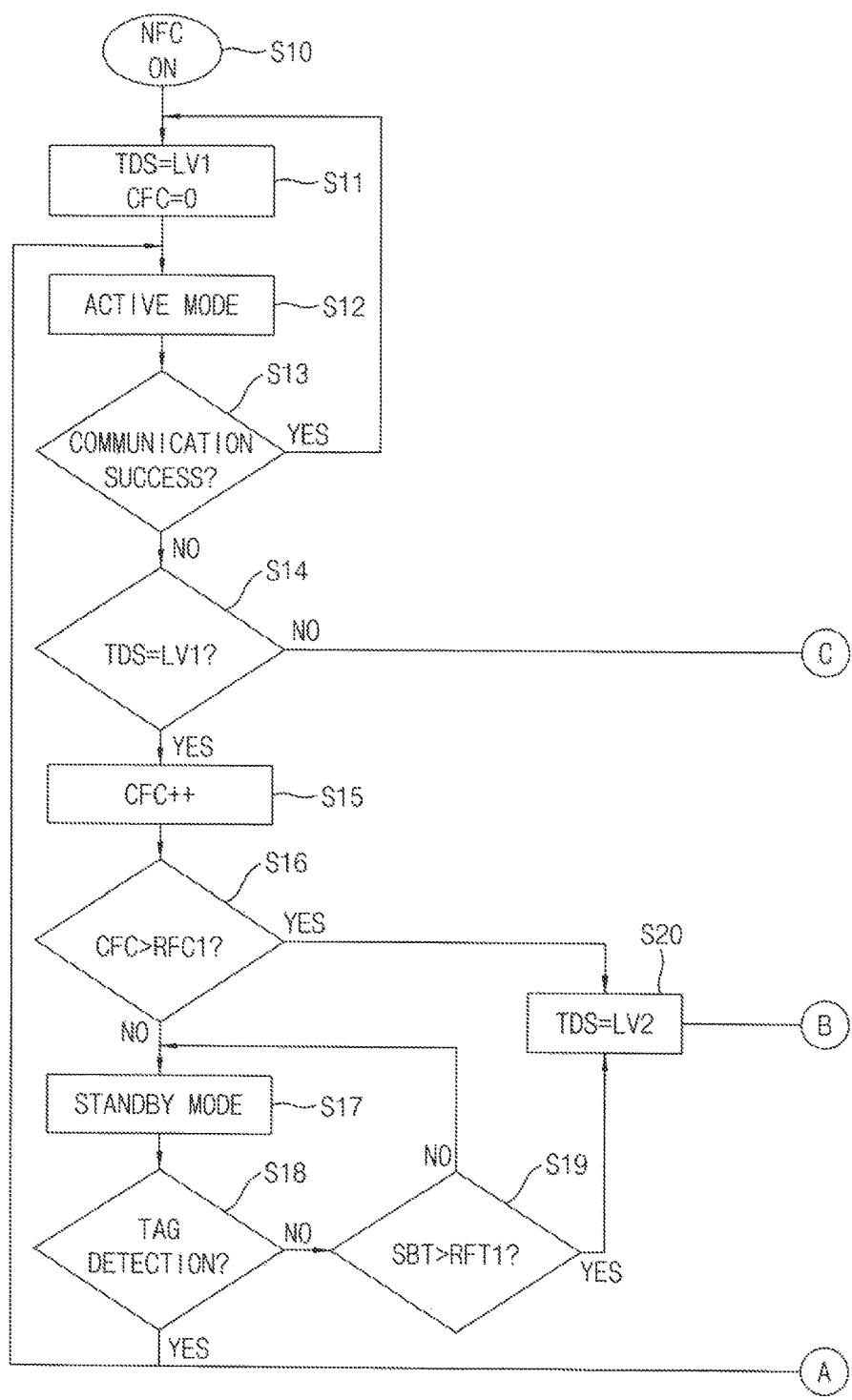
FIG. 24A and FIG. 24B are separate portions of a flow chart illustrating a method of operating an NFC device according to some example embodiments.
Figure 24B:
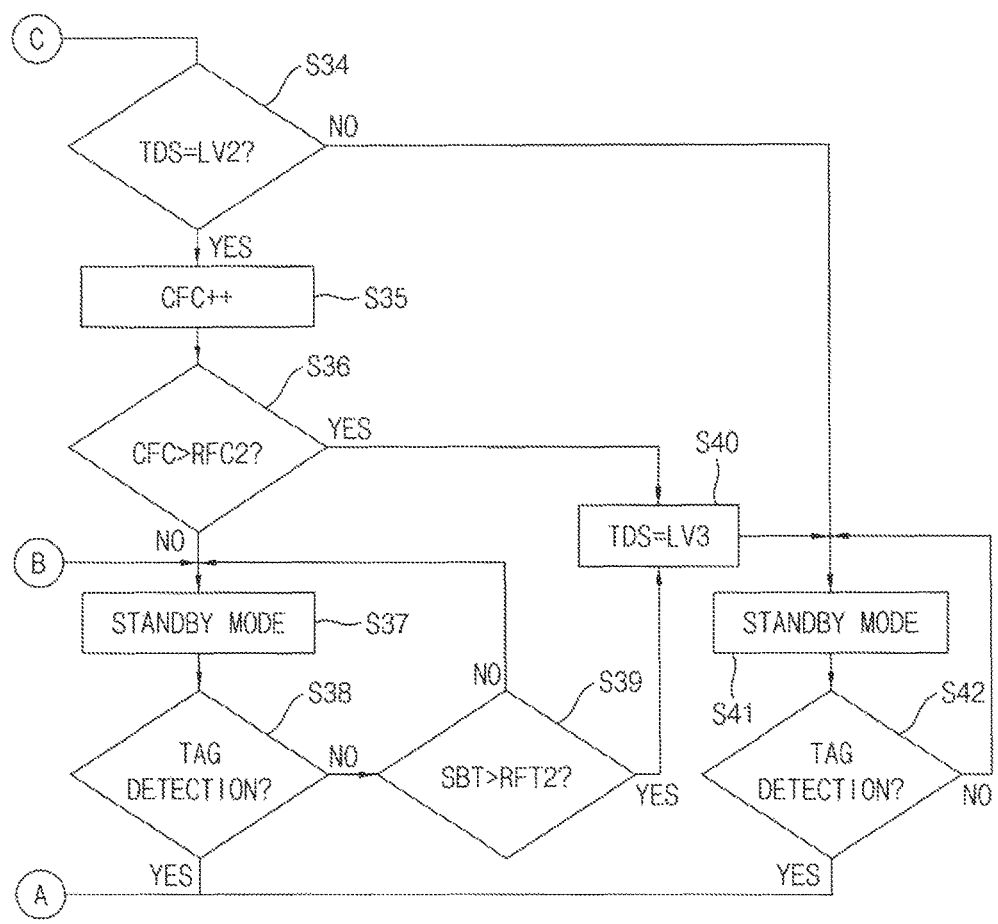

FIGS. 24A and 24B are separate portions of a flow chart illustrating a method of operating an NFC device according to some example embodiments. Even though one or more example embodiments may include the tag detection sensitivity TDS being progressively, sequentially changed between first, second and third sensitivity levels LV1, LV2 and LV3, it would be understood that the present inventive concepts may be embodied to change the tag detection sensitivity TDS between four or more sensitivity levels.

Referring to FIGS. 2, 23, 24A and 24B, if and/or when the user enables the NFC function of the NFC device (NFC ON) (S10), the controller CON in the NFC chip 200 may initialize the tag detection sensitivity TDS to a first sensitivity level LV1, that is, a maximum sensitivity level, and the communication fail count CFC to zero (S11). After the initialization, the NFC chip 200 may perform an operation in the active mode (S12).

When the communication is successful (S13: YES), the controller CON initializes the tag detection sensitivity TDS and the communication fail count CFC (S11) and performs the operation in the active mode (S12) as described above.

If and/or when the communication is failed (S13: NO), the controller CON checks whether the present tag detection sensitivity TDS is a first sensitivity level LV1 (S14).

When the tag detection sensitivity TDS is the first sensitivity level LV1 (S14: YES), the controller CON increase the communication fail count CFC by one (S15) and checks whether the current communication fail count CFC exceeds a first reference count ("threshold quantity value") RFC1 (S16). If and/or when the tag detection sensitivity TDS is not the first sensitivity level LV1 (S14: NO), the controller CON checks whether the current communication fail count CFC exceeds a second reference count RFC2 (S34).

When the communication fail count CFC does not exceed the first reference count RFC1 (S16: NO), the controller CON converts from the active mode to the standby mode and the adaptive tag detector ATD performs the operation in the standby mode (S17), that is, the operation of the tag detection based on the tag detection sensitivity TDS of the first sensitivity level LV1.

When a tag is not detected based on the tag detection sensitivity TDS of the first sensitivity level LV1 (S18: NO), the adaptive tag detector ATD performs the operation in the standby mode as described above (S17) until a duration time SBT of the standby mode exceeds a first reference time ("threshold duration value") RFT1 (S19: NO). If and/or when a tag is detected based on the tag detection sensitivity TDS of the first sensitivity level LV1 (S18: YES), the controller CON converts from the standby mode to the active mode and performs the operation in the active mode as described above (S12).

When the communication fail count CFC exceeds the first reference count RFC1 (S16: YES) or when the duration time SBT of the standby mode exceeds the first reference time RFT1 (S19: YES), the controller CON changes the tag detection sensitivity TDS from the first sensitivity level LV1 to the second sensitivity level LV2 (S20) and the adaptive tag detector ATD performs the operation in the operation in the standby mode (S37), that is, the operation of the tag detection based on the tag detection sensitivity TDS of the second sensitivity level LV2. In some example embodiments, the controller CON may initialize the communication fail count CFC to zero when the controller CON changes the tag detection sensitivity TDS from the first sensitivity level LV1 to the second sensitivity level LV2.

When the tag detection sensitivity TDS is the second sensitivity level LV2 (S34: YES), the controller CON increase the communication fail count CFC by one (S35) and checks whether the current communication fail count CFC exceeds a second reference count RFC2 (S36). If and/or when the tag detection sensitivity TDS is not the second sensitivity level LV2 (S34: NO), the controller CON checks whether the current communication fail count CFC exceeds a third reference count RFC3 (S36). If and/or when the communication fail count CFC does not exceed the second reference count RFC2 (S36: NO), the controller CON converts from the active mode to the standby mode and the adaptive tag detector ATD performs the operation in the standby mode (S37), that is, the operation of the tag detection based on the tag detection sensitivity TDS of the second sensitivity level LV2.

When a tag is not detected based on the tag detection sensitivity TDS of the second sensitivity level LV2 (S38: NO), the adaptive tag detector ATD performs the operation in the standby mode as described above (S37) until the duration time SBT of the standby mode exceeds a second reference time (S39: NO). If and/or when a tag is detected based on the tag detection sensitivity TDS of the second sensitivity level LV2 (S38: YES), the controller CON converts from the standby mode to the active mode and performs the operation in the active mode as described above (S12).

When the communication fail count CFC exceeds the second reference count RFC2 (S36: YES) or when the duration time SBT of the standby mode exceeds the second reference time RFT2 (S39: YES), the controller CON changes the tag detection sensitivity TDS from the second sensitivity level LV2 to the third sensitivity level LV3 (S40) and the adaptive tag detector ATD performs the operation in the operation in the standby mode (S41), that is, the operation of the tag detection based on the tag detection sensitivity TDS of the third sensitivity level LV3. In some example embodiments, the controller CON may initialize the communication fail count CFC to zero when the controller CON changes the tag detection sensitivity TDS from the second sensitivity level LV2 to the third sensitivity level LV3.

When a tag is not detected based on the tag detection sensitivity TDS of the third sensitivity level LV3 (S42: NO), the adaptive tag detector ATD performs the operation in the standby mode as described above (S41) until a tag is detected (S40: YES). If and/or when a tag is detected based on the tag detection sensitivity TDS of the third sensitivity level LV3 (S42: YES), the controller CON converts from the standby mode to the active mode and performs the operation in the active mode as described above (S12). As described above, when the communication is successful (S13: YES), the controller CON initialize the tag detection sensitivity TDS and the communication fail count CFC (S11) and performs the operation in the active mode (S12). As a result, the controller CON may increase the tag detection sensitivity TDS from the third sensitivity level LV3 directly to the first sensitivity level LV1 if the communication succeeds after the tag is detected based on the tag detection sensitivity TDS of the third sensitivity level LV3.

As such, the NFC device and the method of operating the NFC device according to some example embodiments may optimize power consumption and the tag detection range by adaptively controlling the tag detection sensitivity based on the one or more user environment parameters associated with the NFC device. The tag detection range may be secured by increasing the tag detection sensitivity to increase communication success rate and enhance user experience when probability of the communication to be performed by the NFC device is relatively high. In contrast, the power consumption may be reduced by decreasing the tag detection sensitivity when the probability of the communication to be performed by the NFC device is relatively low.

Figure 25:
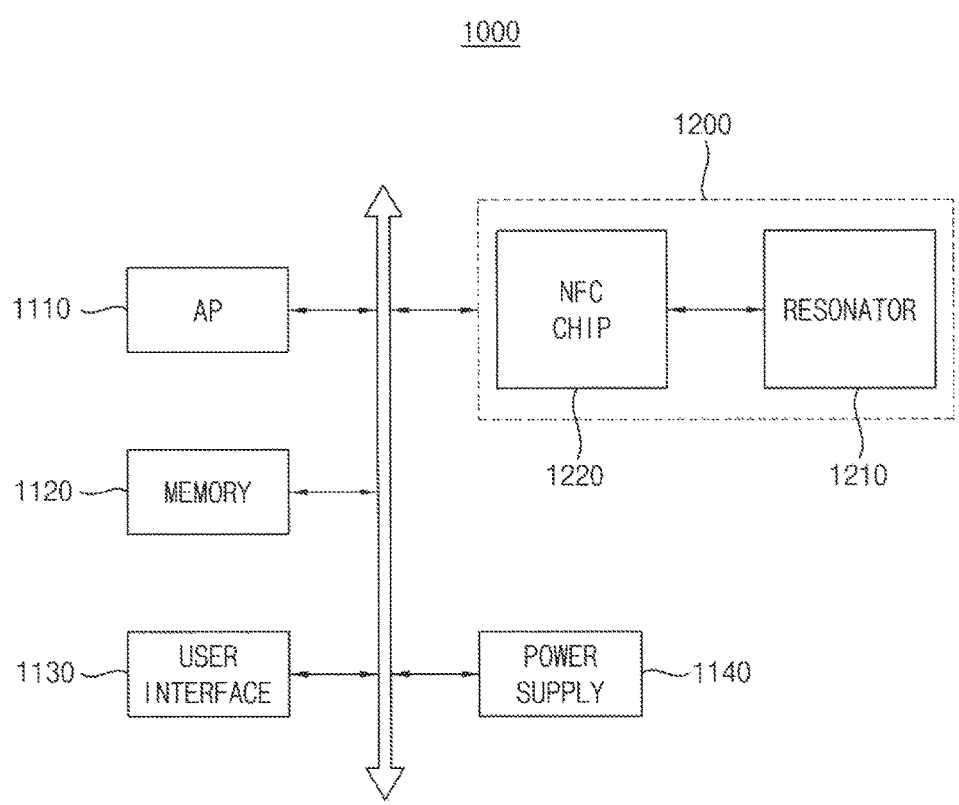
FIG. 25 is a block diagram illustrating an electronic device according to some example embodiments.

FIG. 25 is a block diagram illustrating an electronic device according to some example embodiments.

Referring to FIG. 25, an electronic device 1000 includes an application processor (AP) 1110, an NFC device 1200, a memory device 1120, a user interface 1130, and a power supply 1140.

The application processor 1110 may control overall operations of the electronic device 1000. The memory device 1120 may store data for an operation of the electronic device 1000. The NFC device 1200 may provide the output data stored in the memory device 1120 to the external device through NFC and store the input data received from the external device through NFC into the memory device 1120. The NFC device 1200 includes a resonator 1210 and an NFC chip 1220. As described above, the NFC device 1200 may optimize the power consumption and the tag detection range by adaptively controlling the tag detection sensitivity based on the one or more user environment parameters associated with the NFC device. The user interface 1130 may include at least one input device, such as a keypad or a touch screen, and at least one output device, such as a speaker or a display device. The power supply 1140 may supply a power supply voltage to the electronic device 1000.

The present inventive concepts may be applied to any devices and systems including a NFC device.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A method of operating a near field communication (NFC) device, the method comprising:
   converting the NFC device to operate in a standby mode based on a determination that the NFC device is disengaged from communication with an NFC tag while the NFC device is operating in an active mode, the standby mode associated with a first NFC power consumption level based on generating a radio frequency (RF) field or an electromagnetic wave (EMW) according to emitting a first pulse having a first pulse width, the active mode associated with a second NFC power consumption level based on generating the RF field or the EMW according to emitting a second pulse having a second pulse width, the first NFC power consumption level lower than the second NFC power consumption level, the first pulse width smaller than the second pulse width;
   detecting at least one NFC tag based on a tag detection sensitivity while the NFC device is operating in the standby mode;
   converting the NFC device to operate in the active mode based on detecting the at least one NFC tag while the NFC device is operating in the standby mode; and
   adaptively controlling the tag detection sensitivity associated with the NFC device based on a determination that a user environment parameter associated with the NFC device at least meets a particular condition, wherein the adaptively controlling the tag detection sensitivity includes
      decreasing the tag detection sensitivity from a first sensitivity level to a second sensitivity level that is lower than the first sensitivity level based on a determination that a duration time elapsed while the NFC device is operating in the standby mode exceeds a first threshold duration value, and
      decreasing the tag detection sensitivity from the second sensitivity level to a third sensitivity level lower than the second sensitivity level based on a determination that the duration time elapsed while the NFC device is operating in the standby mode exceeds a second threshold duration value that is longer than the first threshold duration value.

2. The method of claim 1, wherein the user environment parameter includes at least one of a duration time elapsed while the NFC device is operating in the standby mode and a communication fail count indicating a quantity of failures of communication between the NFC device and one or more previously detected NFC tags.

3. The method of claim 1, wherein the adaptively controlling the tag detection sensitivity includes,
   decreasing the tag detection sensitivity based on a determination that a duration time elapsed while the NFC device is operating in the standby mode exceeds a particular threshold duration value.

4. The method of claim 1, wherein the adaptively controlling the tag detection sensitivity includes,
   decreasing the tag detection sensitivity based on a determination that a communication fail count indicating a quantity of failed attempts at communication between the NFC device and one or more previously detected NFC tags exceeds a threshold quantity value.

5. The method of claim 1, wherein the adaptively controlling the tag detection sensitivity includes,
   increasing the tag detection sensitivity based on a determination that the NFC device is engaged in communication with at least one detected NFC tag.

6. The method of claim 5, wherein the adaptively controlling the tag detection sensitivity further includes,
   initializing a communication fail count indicating a quantity of failed attempts at communication between the NFC device and the at least one detected NFC tag based on a determination that the NFC device is engaged in communication with at least one detected NFC tag.

7. The method of claim 1, wherein the adaptively controlling the tag detection sensitivity includes,
   setting the tag detection sensitivity to a maximum sensitivity level based on a user-initiated activation of an NFC function associated with the NFC device.

8. The method of claim 1, wherein the adaptively controlling the tag detection sensitivity includes,
   progressively decreasing the tag detection sensitivity from a maximum sensitivity level through a plurality of lower sensitivity levels sequentially based on the user environment parameter.

9. The method of claim 8, wherein the adaptively controlling the tag detection sensitivity further includes,
   progressively increasing the tag detection sensitivity through each sensitivity level of the lower sensitivity levels to the maximum sensitivity level based on the determination that the NFC device is engaged in communication with at least one detected NFC tag.

10. The method of claim 1, wherein the adaptively controlling the tag detection sensitivity further includes,
    increasing the tag detection sensitivity from the second sensitivity level to the first sensitivity level based on a determination that the NFC device is engaged in communication with at least one detected NFC tag while the tag detection sensitivity is at the second sensitivity level; and
    increasing the tag detection sensitivity from the third sensitivity level directly to the first sensitivity level based on a determination that the NFC device is engaged in communication with at least one detected NFC tag while the tag detection sensitivity is at the third sensitivity level.

11. The method of claim 1, wherein the adaptively controlling the tag detection sensitivity includes,
    decreasing the tag detection sensitivity from a first sensitivity level to a second sensitivity level that is lower than the first sensitivity level based on a determination that a communication fail count indicating a quantity of failed attempts of communication between the NFC device and at least one previously detected NFC tag exceeds a first threshold quantity value; and
    decreasing the tag detection sensitivity from the second sensitivity level to a third sensitivity level that is lower than the second sensitivity level based on a determination that the communication fail count exceeds a second threshold quantity value that is larger than the first threshold quantity value.

12. The method of claim 1, wherein the detecting the at least one NFC tag includes,
monitoring a regulator current of a regulator providing a power supply voltage to a transmitter of the NFC device; and
determining whether the at least one NFC tag is within a threshold proximity range of the NFC device, the threshold proximity range associated with a communication coverage of the NFC device, based on a change in the regulator current and the tag detection sensitivity.

13. The method of claim 1, wherein the detecting the at least one NFC tag includes,
monitoring an antenna voltage generated at a resonance unit of the NFC device while the resonance unit is emitting the EMW; and
determining whether the at least one NFC tag is within a threshold proximity range of the NFC device, the threshold proximity range associated with a communication coverage of the NFC device based on a change in the antenna voltage and the tag detection sensitivity.

14. A method of operating a near field communication (NFC) device, the method comprising:
converting the NFC device to operate in a standby mode based on a determination that the NFC device is disengaged from communication with an NFC tag while the NFC device is operating in an active mode, the standby mode associated with a first NFC power consumption level based on generating a radio frequency (RF) field or an electromagnetic wave (EMW) according to emitting a first pulse having a first pulse width, the active mode associated with a second NFC power consumption level based on generating the RF field or the EMW according to emitting a second pulse having a second pulse width, the first NFC power consumption level lower than the second NFC power consumption level, the first pulse width smaller than the second pulse width;
detecting at least one NFC tag based on a tag detection sensitivity while the NFC device is operating in the standby mode;
converting the NFC device to operate in the active mode based on detecting at least one NFC tag while the NFC device is operating in the standby mode;
decreasing the tag detection sensitivity from a first sensitivity level to a second sensitivity level that is lower than the first sensitivity level based on a determination that a duration time elapsed while the NFC device is operating in the standby mode exceeds a first threshold duration value; and
decreasing the tag detection sensitivity from the second sensitivity level to a third sensitivity level lower than the second sensitivity level based on a determination that the duration time elapsed while the NFC device is operating in the standby mode exceeds a second threshold duration value that is longer than the first threshold duration value.

15. The method of claim 14, further comprising:
decreasing the tag detection sensitivity from a first sensitivity level based on one of,
a determination that a duration time elapsed while the NFC device is operating in the standby mode exceeds a threshold duration value, and
a determination that a communication fail count indicating a quantity of failures of communication between the NFC device and one or more previously detected NFC tags exceeds a threshold quantity value.

16. The method of claim 14, further comprising:
increasing the tag detection sensitivity based on a determination that the NFC device is engaged in communication with at least one detected NFC tag.

17. A method, comprising:
configuring a near field communication (NFC) device to operate in a standby mode based on a determination that the NFC device is disengaged from communication with an NFC tag, the standby mode associated with a first NFC power consumption level based on generating a radio frequency (RF) field or an electromagnetic wave (EMW) according to emitting a first pulse having a first pulse width;
decreasing a tag detection sensitivity associated with the NFC device from a first sensitivity level to a second sensitivity level that is lower than the first sensitivity level based on a determination that a duration time elapsed while the NFC device is operating in the standby mode exceeds a first threshold duration value;
decreasing the tag detection sensitivity from the second sensitivity level to a third sensitivity level lower than the second sensitivity level based on a determination that the duration time elapsed while the NFC device is operating in the standby mode exceeds a second threshold duration value that is longer than the first threshold duration value; and
configuring the NFC device to operate in an active mode, based on detecting, at the NFC device, at least one NFC tag, the active mode associated with a second NFC power consumption level based on generating the RF field or the EMW according to emitting a second pulse having a second pulse width, the second NFC power consumption level greater than the first NFC power consumption level, the first pulse width smaller than the second pulse width.

18. The method of claim 17, further comprising:
adaptively adjusting a tag detection sensitivity associated with the NFC device based on a determination regarding whether a user environment parameter associated with the NFC device at least meets a particular condition.

19. The method of claim 18, wherein the adaptively controlling the tag detection sensitivity includes performing at least one of,
adjusting the tag detection sensitivity based on a determination regarding whether a duration time elapsed while the NFC device is operating in the standby mode exceeds a particular threshold duration value,
adjusting the tag detection sensitivity based on a determination regarding whether a communication fail count indicating a quantity of failures of communication between the NFC device and one or more previously detected NFC tags exceeds a threshold quantity,
adjusting the tag detection sensitivity based on a determination regarding whether the NFC device is engaged in communication with at least one detected NFC tag, and
setting the tag detection sensitivity to a particular sensitivity level based on a user-initiated activation of an NFC function associated with the NFC device.

* * * * *